(12) United States Patent
Aggarwal et al.

(10) Patent No.: US 9,060,392 B2
(45) Date of Patent: Jun. 16, 2015

(54) LIGHTING NETWORK WITH AUTONOMOUS COMMISSIONING

(71) Applicant: ABL IP HOLDING LLC, Conyers, GA (US)

(72) Inventors: Januk Aggarwal, Tyson's Corner, VA (US); Jason Rogers, Herndon, VA (US); David P. Ramer, Reston, VA (US); Jack C. Rains, Jr., Herndon, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 14/557,966

(22) Filed: Dec. 2, 2014

(65) Prior Publication Data

US 2015/0084521 A1    Mar. 26, 2015

Related U.S. Application Data

(63) Continuation of application No. 13/903,330, filed on May 28, 2013, now Pat. No. 8,928,232.

(51) Int. Cl.
*H05B 37/02* (2006.01)

(52) U.S. Cl.
CPC ........ *H05B 37/0218* (2013.01); *H05B 37/0254* (2013.01)

(58) Field of Classification Search
CPC .. H05B 37/02; H05B 37/029; H05B 37/0218; H05B 37/0227; H05B 37/0272
USPC ......................................... 315/149–153, 155
See application file for complete search history.

(56) References Cited

U.S. PATENT DOCUMENTS

| | | | |
|---|---|---|---|
| 5,877,490 A | 3/1999 | Ramer et al. | |
| 5,914,487 A | 6/1999 | Ramer et al. | |
| 7,925,384 B2 | 4/2011 | Huizenga et al. | |
| 8,547,036 B2 * | 10/2013 | Tran .............................. | 315/291 |
| 8,732,031 B2 | 5/2014 | Martin et al. | |

(Continued)

OTHER PUBLICATIONS

"Introducing Philips hue: the world's smartest LED bulb, marking a new era in home lighting"; Philips Sense and Simplicity; http://www.newscenter/philips.com/main/standard/news/press/2012/20121029-Introducing- . . . ; Oct. 29, 2012; Amsterdam, The Netherlands.

(Continued)

*Primary Examiner* — Jason M Crawford
(74) *Attorney, Agent, or Firm* — RatnerPrestia

(57) ABSTRACT

Networked intelligent lighting devices and other elements connected to the network of a lighting system are readily adaptable to desirable networking arrangements as well as logical functional groups, for example by each storing communication provisioning data and/or configuration data for logically associating system elements into one or more groupings or sub-networks. The exemplary systems and system elements may also enable such enhanced network arrangement via autonomous discovery and device commissioning.

18 Claims, 7 Drawing Sheets

(56) References Cited

U.S. PATENT DOCUMENTS

| | | |
|---|---|---|
| 8,749,146 B2 * | 6/2014 | Jones ........................... 315/151 |
| 8,755,039 B2 | 6/2014 | Ramer et al. |
| 8,829,821 B2 | 9/2014 | Chobot et al. |
| 8,928,232 B2 * | 1/2015 | Aggarwal et al. ............. 315/153 |
| 2011/0199004 A1 * | 8/2011 | Henig et al. .................. 315/152 |
| 2012/0013257 A1 * | 1/2012 | Sibert ........................... 315/152 |
| 2012/0040606 A1 * | 2/2012 | Verfuerth ........................... 455/7 |
| 2012/0217880 A1 * | 8/2012 | Nieuwlands et al. ......... 315/153 |
| 2012/0235579 A1 * | 9/2012 | Chemel et al. ................ 315/152 |
| 2013/0234598 A1 * | 9/2013 | Bora et al. .................... 315/113 |
| 2013/0320861 A1 * | 12/2013 | Sinai et al. .................... 315/152 |
| 2014/0001959 A1 * | 1/2014 | Motley et al. ................. 315/149 |

OTHER PUBLICATIONS

Chris Davies; "Philips hue Review"; SlashGear; http://www.slashgear.com/philips-hue-review-07255995/ . . . ; Nov. 7, 2012, London, United Kingdom.

"Raspberry Pi a $30 Computer set to Revolutionize the Teaching of Computing"; Silver Fish hubpages; http://silver-fish.hubpages.com/hub/Raspberry-Pi-a-30-Computer; Aug. 15, 2012.

Entire patent prosecution history of U.S. Appl. No. 13/903,330, filed May 28, 2013, entitled "Lighting Network With Autonomous Commissioning."

* cited by examiner

LIGHTING NETWORK WITH AUTONOMOUS COMMISSIONING

CROSS REFERENCE TO RELATED APPLICATION

The present application is a Continuation of U.S. patent application Ser. No. 13/903,330, filed on May 28, 2013, the contents of which are herewith incorporated by reference.

TECHNICAL FIELD

The present subject matter relates to lighting systems, with network interconnection of elements lighting operations of the system and/or possibly other devices or equipment that may communicate with the lighting devices or via the communications media of the lighting system for other purposes, as well as to commissioning of one or more elements or devices for communication and operation on the system.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

However, deployment of substantial numbers of lighting devices with associated controllers and/or sensors and networking thereof presents increasing challenges for set-up and management of the system elements and network communication elements of the lighting system.

BRIEF DESCRIPTION OF THE DRAWINGS

The drawing figures depict one or more implementations in accord with the present concepts, by way of example only, not by way of limitations. In the Figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a lighting system utilizing intelligent components and network communications, including techniques for commissioning various types of elements, of such a system for communications and/or logical relationships among such elements. Reference now is made in detail to the examples illustrated in the accompanying drawings and discussed below.

Figure 1:
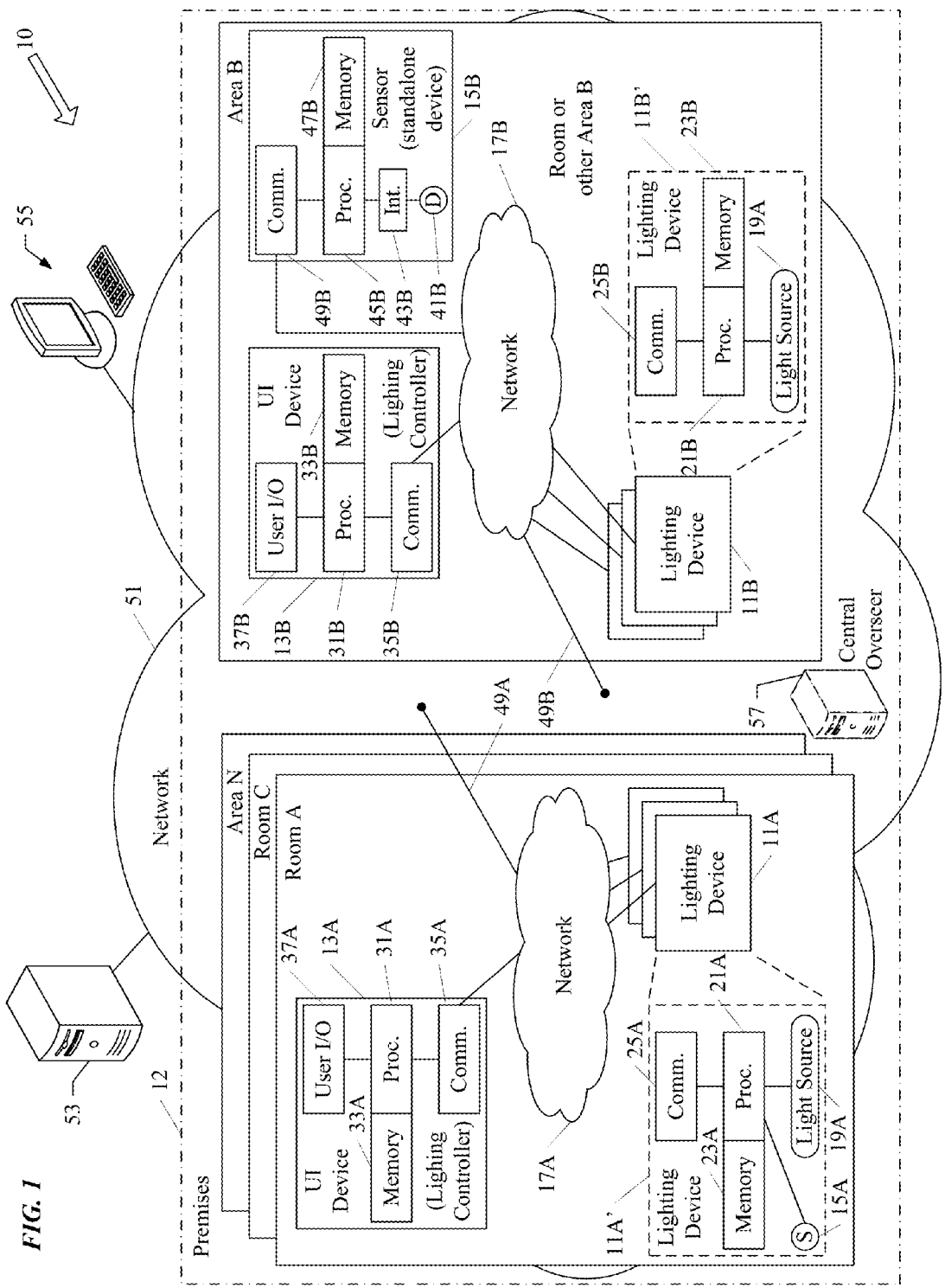
FIG. 1 is a functional block diagram of a simple example of a lighting system having intelligent lighting devices and other intelligent components for lighting related functions and possibly other functions, where the various intelligent system elements are linked or networked for data communications.

FIG. 1 is a high-level block diagram of a networked lighting system 10, many elements of which are installed at a premises 12. The premises 12 may be any location or locations serviced for lighting and other purposes by a networked intelligent lighting system of the type described here. Most of the examples discussed below focus on building installations, for convenience, although the system may be readily adapted to outdoor lighting. Hence, the exemplary system 10 provides lighting and possibly other services in a number of service areas A to N in or associated with a building, represented by room A and room or other service area B, and generally by other room C and service area N. Examples of other types of service areas include a corridor a building and an outdoor area associated with a building.

The lighting system elements, in a system like system 10 of FIG. 1 may include any number of lighting devices, such as fixtures and lamps, as well as lighting controllers, such as switches dimmers and smart control panels. The lighting controllers may be implemented by intelligent user interface devices, although intelligent user interface devices on the system 10 may serve other purposes. The lighting system elements may also include one or more sensors used to control lighting functions, such as occupancy sensors, ambient light sensors and light or temperature feedback sensors that detect conditions of or produced by one or more of the lighting devices. The sensors may be implemented in intelligent standalone system elements, or the sensors may be incorporated in intelligent lighting devices, e.g. as an enhanced capability of a lighting device. A system like that shown in the drawing may incorporate or at least provide communication capabilities or services for use by other devices within the premises 12.

Hence, in our example, each room or other type of lighting service area illuminated by the system 10 includes a number of lighting devices as well as other system elements such as one or more user interface devices each configured as a lighting controller or the like.

As shown, the service area represented by room A in the example includes an appropriate number of first lighting devices 11A, for example, to provide a desired level of lighting for the intended use of the particular space in room A. The equipment in room A also includes a user interface (UI) device, which in this example, serves as a first lighting controller 13A. In a similar fashion, the equipment in room or other service area B in the example includes an appropriate number of second lighting devices 11B, for example, to provide a desired level of lighting for the intended use of the particular space in area B. The equipment in service area B also includes a user interface (UI) device, which in this example, serves as a second lighting controller 13B. Examples of UI devices that may be used are discussed in more detail later.

Although some service areas may not include a sensor, the equipment in each of the service areas A and B includes one or more sensors, although the sensors in these two examples are implemented in somewhat different ways. In room A, the sensor 15A is an element of one or more of the lighting devices 11A. In room B, The sensor 15B is implemented as a standalone system component. Such sensors may detect a condition that is relevant to lighting operations, such as occupancy, ambient light level or color characteristics of light in an area or level or color of light emitted from one or more of the lighting devices serving the area. Other sensors may detect other conditions that are relevant to other functions of the system or for more general communication about conditions in an area for still further purposes, such as temperature or humidity for HVAC control or vibration for reporting of earthquakes or similar events. Other examples of conditions that may be detected by appropriate sensors include a security condition, an accident/collision detection, an object/occupant identification, etc. Different sensors for different types or sets of conditions may be relevant in different system installations, e.g. some of these examples might be more relevant in warehouse type system applications. For purposes of further discussion of FIG. 1, however, we will focus of implementations that include sensors for purposes related to lighting operations of the system 10.

The lighting devices 11A, the lighting controller 13A and the sensor 15A (if provided in one of the lighting devices 11A) are located for lighting service of the first service area, that is to say, for controlled lighting within room A in the example. Similarly, the lighting devices 11B, the lighting controller 13B (if provided) and the sensor 15B (if provided) are located for lighting service of the second service area, in this case, for controlled lighting room or other type of area B.

The equipment in room A, in this example, the lighting devices 11A, the lighting controller 13A and the sensor 15A in one of the lighting devices 11A, are coupled together for network communication with each other through data communication media generally represented by the cloud in the diagram to form a first physical network 17A. Similarly, the equipment in second area B, in this example, the lighting devices 11B, the lighting controller 13B and the sensor 15B, are coupled together for network communication with each other through data communication media generally represented by the cloud in the diagram to form a first physical network 17B.

Many installations will include equipment for providing lighting and other services in a similar manner in other rooms and/or other types of services areas within or on a particular premises 12, such as in a building or on a campus. Although not shown, in similar detail, such other service areas are represented generally by Room C to Area N in the example illustrated in FIG. 1.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition light for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises 12 served by a system 10 has other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of light emitting unit.

In the examples, the intelligence and communications interface(s) and in some cases the sensors are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities and/or any associated sensor.

The example of system 10 utilizes intelligent lighting devices. Hence, each lighting device has a light source, a processor, a memory and a communication interface. By way of an example, one of the lighting devices 11A is shown in expanded block diagram form, as represented by the dashed line box at 11A'. As shown by that expanded example, each device 11A in room A includes a light source 19A, a processor 21A, a memory 23A and a communication interface 25A. In service area A, at least one of the lighting devices 11A' includes the sensor 15A, as well. The drawing also shows one of the lighting devices 11B' in expanded block diagram form. As shown at 11B', each lighting device 11B includes a light source 19B, a processor 21B, a memory 23B and a communication interface 23B.

The sensors also have associated intelligence and communication capabilities. In the example of room A, the intelligence and communication capabilities associated with the sensor 15A are those of the host lighting device 11A'. In the example of room or other service area B, the sensor 15B is a standalone device incorporating its own associated intelligence and communication capabilities, as will be discussed in more detail, later.

The UI devices serving as the lighting controllers in this example also are implemented as smart/intelligent devices with processing and communication capabilities. Hence, each lighting controller includes a processor, a memory and a communication interface, as well as one or more input and/or output elements for physical user interaction. As shown by way of example, the UI device serving as lighting controller 13A in room A includes a processor 31A, a memory 33A and a communication interface 35A. The UI device serving as lighting controller 13A also includes one or more user input and/or output elements represented generally by user I/O element 37A in the drawing. The element 37A, for example, may include a toggle switch, a rotary controller, one or more sliders, a keypad and/or a touchscreen display. A touchscreen display, for example, may support touch and touch gesture input as well as visual display output. Other examples of the UI input may include a video input and associated processing for gestural control detection, a microphone, an occupancy/motion sensor, proximity sensor, etc. Outputs may be visual, audible, tactile, etc. For example, a microphone and/or speaker may be used to support audible input and/or output, whereas a camera in combination with projector or display may be used to support visual input and/or output. As shown by way of example, the UI device serving as lighting controller 13B in service area B includes a processor 31B, a memory 33B and a communication interface 35B. The UI device serving as lighting controller 13B also includes one or more user input and/or output elements represented generally by user I/O element 37B in the drawing. The element 37B, for example, may be similar to the I/O element 37A in UI device 13A, examples of which were discussed earlier. Of course, other elements may be used to receive input from and/or provide output to a user, in any of the UI devices/controllers 13A, 13B.

As outlined earlier, in the example of FIG. 1, any sensors included in the system 10 also have or are associated with intelligence and communication capabilities. The sensor 15A is integrated into a lighting device; and the processor, memory and communication interface of that device provide the intelligence and communication capabilities associated with that sensor 15A. The sensor 15B, however, is a standalone device and includes its own individual intelligence and communication capabilities.

The sensor 15B includes a physical condition detector (D) 41B, which is the actual device that is responsive to the particular condition to be sensed. The detector 41B may receive a drive signal; and in response to the sensed condition, the detector 41B produces a signal having a characteristic (e.g. voltage magnitude) that is directly related to a characteristic level of the sensed condition. The sensor 15B also includes a detector interface circuit (Int.) 43B. The circuit 43B provides any drive signal that may be needed by the particular device type of physical condition detector 41B. The detector interface circuit 43B also processes the output signal from the detector 41B to produce a corresponding output, in a standardized data format, for use by the associated intelligence. The integrated sensor 15A in lighting device 11A may be implemented by a detector and interface circuit analogous to the physical condition detector 41B and the detector interface circuit 43B.

The standalone implementation of a sensor 15B also includes a processor 47B and an associated memory 47B. The sensor 15B also includes a communication interface 49B, typically similar to or complimentary with the interfaces 25B and 35B used by other devices 11B or 13B in the particular service area B.

Although not shown for convenience, there may be multiple communication interfaces for data communication over multiple media in any one system element (e.g. wider area network over Ethernet and local communication for example on WiFi or Bluetooth or Zigbee or DMX etc.).

Some of the intelligent system elements, e.g. lighting devices, UI devices or sensors, may have or be enhanced with audio or video input or output equipment. A sensor, for example, may include a camera and/or a microphone as the detector(s). A UI device may include a display for output and may include a camera for user input, alone or in combination with other user input elements. For example, a UI device arrangement might utilize a touchscreen alone or in combination with a camera. Alternatively, a UI device may utilize a microphone for audio input alone or in combination with a speaker for audio output to the user. Audio and/or video sensing as well as audio and/or video output capabilities also may be incorporated into enchanted lighting devices. Such a lighting device, for example, might have or connect to a speaker and a projector to provide audio-visual information output. A microphone and/or camera in an enhanced lighting device might provide area monitoring and/or additional form(s) of user input to the system for lighting or other purposes.

Although not shown, each of the system elements that uses power to operate as described may include a power supply circuit and will connect to or possibly contain a power source. The lighting devices 11A and 11B may draw power from an AC grid or from a DC grid. The lighting devices 11A and 11B, for example, may draw power from alternating current (AC) mains in the building or other type of premises where the system 10 may be installed. In an AC grid type example, the power supply circuit of a particular lighting device 11A or 11B will include a light source driver circuit to process power drawn from the AC mains in any manner as may be appropriate to drive the particular type of light source incorporated in the particular lighting device. The source driver may be a simple switch controlled by the processor, for example, if the source is an incandescent bulb or the like that can be driven directly from the AC current. As another example, the drive circuit may convert AC power to one or more appropriate DC voltage and/or current levels to provide power to DC driven light source(s) such as light emitting diodes (LEDs). The power supply would also process AC power from the mains to provide voltage and/or current levels to power the elements (e.g. processor, memory and interface) serving as the device intelligence and for the communication interface.

In the example, the power supply circuit for each lighting device receives electricity from AC mains, however, one or more of the lighting devices for each service area may be driven by a battery or other power source for a particular application. For example, one or more lighting devices in each room and one or more lighting devices in a corridor each may have or connect to a back-up battery or other back-up power source to supply power for some period of time in the event of an interruption of power from the AC mains.

Other system elements in each service area, such as lighting controllers or other user interface devices and/or any standalone sensors would likewise include appropriate power supply circuits, which may rely on AC or DC power from the mains, battery power and/or ambient power harvesting, etc., as needed to operate the components of each respective system element. Examples of ambient power harvesting include vibration responsive power generation, photovoltaics, mechanical work (e.g. EnOcean), etc.

As noted, system elements within a room or other service area are coupled via suitable links for network data communications, as represented generally by the network clouds 17A and 17B. The system 10 also includes communication links coupling the first and second physical networks into a wider area network. The local service area networks 17A, 17B may be relatively distinct from each other and distinct from but coupled to a wider area network as shown generally at 51, or the networks may be relatively unified. Various network media and protocols may be used for the data communications. The networks 17A, 17B allow elements within respective service areas A and B to communicate with each other, and the links or couplings 49A, 49B of those networks to the wider area network 51 allow the elements within each of the service areas to communicate with elements in other service areas and/or to communicate with other devices generally represented by way of example by the server/host computer 53 and the user terminal device 55.

The host computer or server 53 can be any suitable network-connected computer, tablet, mobile device or the like programmed to implement the desired functionalities. Such a device may have any appropriate data communication interface to link to the wider area network 51. If provided, a host or server computer at the premises may utilize the same networking media 17A or 17B and/or 51 utilized by the on-premises system elements.

The user terminal equipment such as that shown at 55 may be implemented with any suitable processing device that can communicate and offer a suitable user interface. The terminal 55, for example, is shown as a desktop computer with a wired link into the wide area network 51. However, other terminal types, such as laptop computers, notebook computers, netbook computers, and smartphones may serve as the user terminal computers. Also, although shown as communicating via a wired link from the wide area network 51, such a device may also or alternatively use wireless or optical media; and such a device may be operated at the premises 12 and utilize the same networking media 17A or 17B utilized by the on-premises system elements.

For various reasons, the communications capabilities provided at the premises 12 may also support communications of the lighting system elements with user terminal devices and/or computers within the premises. The user terminal devices and/or computers within the premises may use communications interfaces and communications protocols of any type(s) compatible with the on-premises networking technology of the system 10. Such communication with a user terminal, for example, may allow a person in one part of the premises 12 to communicate with a system element in another area of the premises 12, to obtain data therefrom and/or to control lighting or other system operations in the other area.

For some lighting system functions discussed more, later, it may be useful to include a central overseer (CO) functionality, in or logically associated with the premises 10. Such a CO functionality provides centralized management of the relevant system functions, for example, to assist in set-up of various logical relationships during provisioning and/or configuration of newly installed or repaired system elements in the various service area(s) of the premises 12. At least some functions of the system 10 may rely on a central controller, for example, to control all lights on a floor or the like under certain conditions (e.g. to turn all lighting except emergency lighting off after hours or to turn on lighting in a manner to lead people to exits in the event of a fire) or to monitor and process all data from sensors of a particular type. Central controller functionalities could be separately implemented, but in the examples are combined with the data management and commissioning assistance functions in one or more COs 57. Hence, the system may include one or more "central overseers", each of which may only contain partial information, information relevant to a specific grouping and/or function. For example, one CO may be set-up as a floor CO, another CO may be set-up as a building CO, etc. Another example, one type of CO (deployed as one or more instances) may serve as a "sensors" overseer that has information about sensors on the system. Likewise, the system could have overseers for "luminaires," "control interfaces," "third party devices," etc. Some installations may also include CO of COs to help with higher level groupings amongst various COs.

The drawing shows a central overseer (CO) 57 in or coupled to the network 51 but generally within the premises 12 (bottom middle of the drawing), by way of an example. If provided as a physical device, such an element may be implemented by appropriate programming of a general purpose computer as a host or server for the particular CO application. The central overseer (CO) functionality, however, may be implemented on a distributed processing basis, either on a number of computers inside or outside of the premises or even as programming executed by processors of some or all of the lighting devices, user interface (UI) devices, sensors, etc. of the system 12, e.g. installed in the various service areas at the premises 12, or combinations thereof. For example, on-site processing capability may be enhanced or redundancy may be built into the system, by utilization of off-site computing resources.

The external elements, represented generally by the server/host computer 53 and the user terminal device 55, that may communicate with the system elements at the premises may be used by various entities and/or for various purposes in relation to the lighting system 10. For example, a terminal such as 55 may allow personnel of an entity that operates the premises to monitor operations of lighting and other systems at the premises and/or make adjustments, remotely.

As another example of use of external communications, a server or a combination of server and terminal device may be operated by a service company, for example, a lighting system service company. Such a service provider may use the external computer equipment 53 and/or 55 to remotely monitor health of the elements of the lighting system 10 at the premises 12 and remotely provide related services to the entity owning or operating the premises, such as troubleshooting, software corrections/upgrades or the like via communication via the Internet or an Intranet with the lighting system on the particular premises. In such an example, the provider's service functionalities may be considered as being out in the 'cloud.'

As shown, the networks and elements of the system 10 in the premises 12 are accessible from the outside, and this accessibility also may make information from within the lighting system at the premises 12 available to outside third parties, e.g. the power company, NOAA, etc. For example, the system can provide sensor data and/or data about operating conditions of various elements at the premises 12 to such third parties.

As will be discussed in more detail later, various circuit elements (e.g. processor devices, memories and associated architectures) may be used to implement the intelligence of the various lighting system elements in the rooms or other services areas. Also, the communications within the rooms and other services areas as well as the communications to and of the wider area network all may use various different types of data networking media and protocols. As a result, various types of one or more communications interfaces may be incorporated into each of the various lighting system elements in the rooms or other service areas and/or remote devices in communication therewith, depending on the particular media and/or protocol to be used in a particular premises or service area thereof.

As shown by the discussion of the components of the system 10 so far, system elements in each service area include intelligence as well as communications capabilities. The precise operations of such a system can be defined by provisioning and/or configuration data stored in and used by the various intelligent system elements. In the examples, provisioning data is data used to set-up or enable operation of a system element so as to communicate via at least a portion of one or more of the networks of the system 10 and though such networking to communicate with some or all of the other elements of the system. In addition to communication via the physical network, elements of the system 10 can be logically associated to form logical groups or logical sub-networks, for a variety of purposes. In the examples, configuration data is data used to establish one or more such logical associations.

As used herein commissioning encompasses various functions to set-up elements of the system for operations. Examples of functions involved in commissioning include provisioning elements for network communications, e.g. for physical communication with other elements via the applicable network media. Provisioning often entails at least some storage of data (sometimes referred to as provisioning data) for use in such communications within each system element. Some provisioning data also may be stored in an element implementing a routing or central network control function, e.g. to facilitate network-side aspects of the physical communications. Examples of functions involved in commissioning also include configuration of system elements to associate elements in one or more logical groupings of 'sub-networks,' to facilitate functional operations of the associated system elements. Configuration also will typically entail storage of data (sometimes referred to as configuration data) in the elements being associated in a particular logical group or sub-network. For example, the data stored in an element may identify one or more logical groupings to which the particular element belongs. Some configuration data also may be stored in an element designated to implement a central overseer type control function.

In the example of FIG. 1, provisioning data is stored in the memories 23A of the first lighting devices 11A and the memory 33A of the first lighting controller 13A to enable physical communication among the first lighting devices 11A and the first lighting controller 13A via the network 17A and to enable physical communication of the first lighting devices 11A and the first lighting controller 13A via the wider area network 51. Configuration data is stored in the memories 23A of the first lighting devices 11A and the memory 33A of the first lighting controller 13A for logically associating the first lighting devices 11A and the first lighting controller 13A together to operate as a first area lighting system, in this example, providing lighting service to the room A. Since the sensor 15A is implemented as an element of lighting device 11A', the provisioning and configuration data of that device 11A' facilitate communications via the networks 17B and 51 regarding sensor operations as well as operations of the sensor as part of the first area lighting system.

In a similar fashion, provisioning data also is stored in the memories 23B of the second lighting devices 11B and the memory 33B of the second lighting controller 13B to enable physical communication among the second lighting devices 11B and the second lighting controller 13B via the network 17B and to enable physical communication of the second lighting devices 11A and the second lighting controller 11B via the wider area network 51. Furthermore, configuration data is stored in the memories 23B of the second lighting devices 11B and the memory 33B of the second lighting controller 13B for logically associating the second lighting devices 11B and the second lighting controller 13B together to operate as a second area lighting system, in this example, providing lighting service to the room or other type of service area B. Since the sensor 15B is implemented as a standalone device, similar provisioning and configuration data is stored in the memory 47B of the sensor 15B, to facilitate its communications via the networks 17B and 51.

In addition, configuration data is stored in the memories of at least one of the first lighting devices 11A and the first lighting controller 13A and stored in the memories of at least one of the second lighting devices 11B and the second lighting controller 13B to logically associate the elements storing such data in respective memories together to operate as a system for a predetermined function for both the first area A and the second area B. For example, such configuration data may be stored in the lighting controllers 11A, 11B to group the controllers together, so as to coordinate a lighting status reporting function. Sensors of a particular type, e.g. temperature, ambient light level and/or occupancy, also may be grouped together for a common reporting function or to provide a common influence with respect to lighting or some other operation or function associated with the building premises.

The provisioning and/or configuration data may be stored into the memories of the various system elements via a variety of procedures. For example, one or both types of data may be manually input by a technician with a terminal device, as system installation or as new elements are added to an existing installation. Examples discussed in more detail below rely on more automated commissioning techniques to acquire and store some or all such data that may be useful in setting up the elements to operate as a networked lighting system.

At a high level, a lighting device 11A or 11B may be arranged so as to automatically exchange communications with one or more other lighting devices, to autonomously establish a network arrangement of the respective lighting device with the one or more other lighting devices. With such an arrangement for automatic commissioning, each lighting device will be able to automatically cooperate with the one or more other lighting devices to provide controlled lighting for a service area. For example, once commissioned, the lighting devices 11A cooperate to provide controlled illumination within the room A; and once commissioned, the lighting devices 11B cooperate to provide controlled illumination within the room or other type of service area B. Other elements, such as the user interface devices, in this first example serving as the lighting controllers and any sensors in the areas of lighting service similarly communicate with lighting devices, etc., to autonomously establish a network arrangement and to establish configuration(s) to enable such other elements to also cooperate in the controlled lighting for each respective service area.

The commissioning communications, to autonomously establish desired communications and cooperative logical relationships, involve one or more procedures to discover other lighting system elements and possibly the capabilities of such other elements and to establish logical relationships accordingly. In the examples discussed below, such discovery may relate to several somewhat different things. In one case, a lighting device or other system element discovers other elements with which the element is 'networked,' e.g. within a defined service area and/or providing a communication access to other networked facilities. However, other cooperative relationships may be established based on element discovery and associated configuration, for example, to discover other elements in the general vicinity, including some element(s) that may be outside the particular service area. Discovered elements ultimately may or may not be configured as part of the same logical network or group as the element that is conducting automatic discovery, for a particular system purpose. For example, this discovery may detect lighting devices 11A in room A as well as one or more devices outside the door of the room in an adjacent corridor type service area N. For local control, the devices 11A would be included in a group for room A, but the lighting device in the adjacent corridor would not. However, for emergency exit lighting, a device 11A near the door and one or more lighting devices in the corridor may be associated in a logical group or network to provide lighting in the event of a detected emergency such as a fire.

Discovery to form a sub-network or the like based on logical associations for a defined system function, purpose or service typically utilizes the network communications. However, some discovery of other elements for logical groupings of elements in proximity to each other (both in and outside of a network for one service area) may use other channels, such as a light channel based on transmission of modulated light from one element (e.g. from a lighting device or from a sensor, UI device or third party device with a light emitting component) and sensing thereof by a detector in another system element (e.g. in another lighting device, sensor, UI device or third party device).

For convenience, we will use discovery by one lighting device with respect to other lighting devices as an initial example, although similar procedures may apply in discovery of and by other types of elements of the system, such as UI devices 13A, 13B or sensors such as 15B.

For example, the function to automatically exchange communications with one or more other lighting devices implemented by a respective lighting device may involve sending a signal identifying the respective lighting device to each of the other lighting devices. Each other device sends, and thus the respective device receives responsive signals; and each such received signal identifies one of the other lighting devices. From these received signals, the respective lighting device performing the commissioning can compile a list, table or the like in memory, to effectively store each received identification of another of the lighting devices in its memory.

As part of several exemplary procedures, a lighting device or the like will also send information identifying its capabilities to each of the other lighting devices (or other system elements) with which the respective device communicates. A respective lighting device or the like will also receive and store in its memory lighting device information identifying capabilities of each of the one or more others of the lighting devices in association with the stored identification of each of the one or more others of the lighting devices. Similar information may be obtained and stored in memory with respect to other system elements, such as controller and sensors.

In at least some examples, the lighting device or the like will also detect signals from or communicate back and forth with other system elements in a manner that allows the element that is conducting its commissioning to detect system elements that are in its vicinity and/or to determine relative proximity of such other system elements. For example, the commissioning element may detect strength of some physically limited signal modulated with an identifier of another element, such as visible or infrared light, audio, etc.

From the various information obtained in this manner, a respective lighting device, for example, can determine relative proximity of the one or more other lighting devices to the respective device. A listing of identifications of the other lighting devices (and possibly of other system elements) stored in the memory can then be prioritized based on the determined relative proximity of the other lighting devices or other system elements. Based on the listing prioritized based on relative proximity, a lighting device (or other system element) can select the identification of at least one of the one or more others of the lighting devices or the like, with which to establish a logical network association.

Alternatively or in addition, priority of identified lighting devices and/or other system elements can be based on information identifying capabilities of other lighting devices (and/or of other system elements like lighting controllers and/or sensors) accumulated by received from another system element, such as another element in the vicinity or a CO service.

Based on the listing prioritized based on capabilities, any system element conducting discovery and self-commissioning can then select the identification of at least one of the one or more others of the lighting devices or other elements, to establish another logical network association.

As noted earlier, the elements of the system 10 can communicate via networks 17A, 17B and 51 with various devices outside the premises, for a variety of purposes. For example, a lighting system vendor or other service provider may operate one or more servers 53 and/or terminal devices 55 to remotely monitor and service the elements of lighting system 10 at the premises. As the lighting devices become more intelligent, they require a different level or type of ongoing maintenance. The LEDs in many modern fixtures or lightbulbs, for example, may last a long time without needing the traditional bulb replacement of older fixtures. However, the programmable processors and memories in the associated control and communication equipment are essentially information technology (IT) resources that require IT type service, e.g. configuration and software/firmware management. The networking of the lighting elements together with associated communication with outside network(s) 51 allows the enterprise or a third party service provider to perform the IT type maintenance on the lighting system equipment remotely from a server 53 or from a remote user terminal device 55. For example, a vendor that sells the lighting devices, controllers, sensors and associated networking gear may offer a maintenance service, to remotely monitor and manage at least the elements of lighting system. For example, if issues arise with provisioning or configuration during self-commissioning, the vendor can provide remote assistance.

Light fixtures, and in many case, other types of lighting devices, remain in use for many years, e.g. 10, 20 or more years. Physical aspects of such devices may remain unchanged for the useful lifetime of the lighting devices without physical upgrade. At most, a source such as a lightbulb may be replaced when it wears out, but the rest of the device remains in operation. In the paradigm of the disclosed system of networked intelligent lighting devices, the software/firmware programming and configuration data can be changed from time to time, e.g. to upgrade or add functionality, to accommodate new lighting devices or other equipment as may be added to the system from time to time, etc.

The commissioning process outlined herein can serve both to provision elements of the lighting system 10 for communications via the relevant network media at the premises 12 as well as to define logical associations into groupings or subnetworks for purposes of coordinated functional operations within the system 10. It may be helpful to consider some examples of physical networking and logical associations, which can be configured in a system like that of FIG. 1 via an autonomous commissioning procedure.

The intelligence (processing and associated memory capacities) for the system is spread among many different elements in the system. As a result, the degree of intelligence in any one device/element need not be that complex; and alternatively, a central intelligent functionality such as a server or host computer may or may not be necessary. Individual lighting devices therefore need not be too complex or expensive, and in at least some installations, there is no need for additional expensive computer or software for a central intelligent control functionality.

The lighting device will include a 'brain' or central processing unit (CPU) component, which essentially includes the processor and memory (see examples in FIG. 1). Although not separately shown in FIG. 1, the lighting device also may include one or more standard connectors for coupling of other components to the 'brain' of the device. The CPU component may include the one or more communications interfaces, or the communications interface(s) may be provided via a separate component/board/module. If built on a personal computer like design, for example, a light fixture might include one mother board that has the CPU circuitry, an Ethernet port, a WiFi transceiver and one or more USB ports and a coupling to connect to a standard light driver. However, each lighting device (e.g. enhanced fixture or luminaire in our examples) could utilize the same mother board, although different implementations/product offerings could incorporate different light sources coupled to the light driver port and/or different enhancements (e.g. sensors, or input/output devices coupled to the USB port(s)).

As products sold to customers, the lighting equipment manufacturer could offer a range of lighting devices with a wide range of capabilities at various price points. However, across such products, many elements of the devices, including the 'brain' and the communications elements and other interfaces, would be essentially the same. Interfaces configured for standardized modular plug-in coupling could be provided in such devices to facilitate easy addition of various enhancements, such as sensors, input and/or output devices (e.g. for audio and/or video), extra memory, extra processor(s), additional communication components, etc. Plug-in here may utilize a physical and electrical connection or utilize some other type of coupling, e.g. capacitive or inductive. Any plug-in module that may require the 'brain' of the device to run additional programming for the device to be able to utilize or work with the plug-in module could have the requisite programming stored in memory in the module. In such a case, the 'brain' of the device and the module would be configured to upload the requisite programming form the memory of the plug-in module to the memory of the device, when the module is installed in the device. Alternatively, installation of the plug-in module could cause the processor of the device to communicate via network with an appropriate server to obtain any programming that may be required for proper device operation with the newly installed module.

A PC based approach may be based on any microprocessor architecture such as a Reduced instruction set computing (RISC) using an ARM architecture, as commonly used today in mobile devices and other portable electronic devices, or a microprocessor architecture more commonly used in computers such as an instruction set architecture (ISA), like those used in Intel microprocessors and the like.

The PC-like or other microprocessor based approaches are discussed by way of examples; and other processor implementations may be used, such as based on a Peripheral Interface Controller (PIC) or other microcontroller architecture. Alternative intelligent architectures for the intelligence of the devices, however, will still include appropriate communication interfaces and couplings for light sources and may include other standardized ports for connections of sensors, user input/output devices, etc.

The sensor elements (S) of the system (see 15B in FIG. 1) may have electronics somewhat similar to those of the lighting devices discussed above, particularly with respect to the 'brain' and the communication interface(s). The sensor elements, however, may include USB or other port(s) for coupling to physical detector elements and associated electronics built to the selected interface standard (e.g. USB). The user interface (UI) devices likewise may have electronics somewhat similar to those of the lighting devices discussed above, particularly with respect to the 'brain' and the communication interface(s); although UI devices may incorporate or have ports for particular types of user input/output components. Third parties may opt to build their devices (PD) intended for use in the lighting system in a similar manner, although they may choose to incorporate other sensors, input/output elements or the like and program the devices for their own purposes. However, the third party devices would include communication interfaces compatible with the particular networking media selected for the particular premises.

Figure 2:
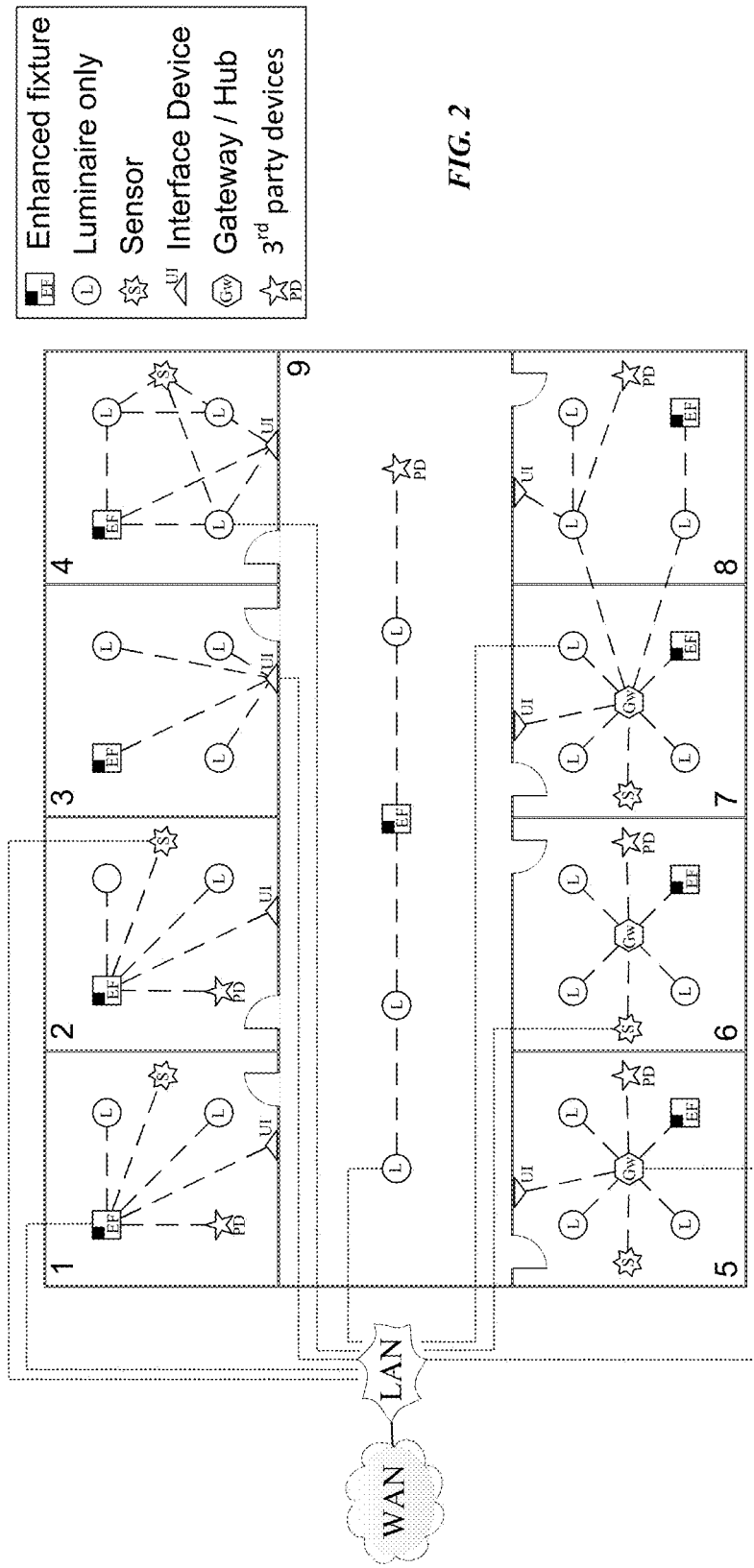
FIG. 2 is a layout diagram, for a simple example of a portion of a building with an overlay of lighting system elements, useful in explaining various examples of physical network configurations that may be implemented in a system like that shown in FIG. 1.

FIG. 2 shows a simple layout of a building or a portion of a building with a network system of lighting devices and related equipment installed therein, similar to that discussed above relative to FIG. 1. For purposes of illustration and discussion here, the building includes eight rooms along one long corridor. However, it should be readily apparent that the system under discussion here can be easily adapted to indoor installations with fewer or more rooms, more corridors, multiple floors, multiple buildings or to outdoor installations alone or in combination with in-building installations.

For discussion purposes, different rooms are shown with different networking arrangements of the various interconnected elements. However, it should be readily apparent that the system may use the same networking arrangement in several or all rooms/corridors or may use still other networking arrangements instead of or in addition to the illustrated examples.

This first layout drawing is intended to illustrate aspects of examples of the physical networking of lighting, communication and other elements of a system, as may be deployed in a building in this example. Hence, this first layout diagram illustrates a number of different examples of the physical networking of various system components throughout the exemplary building. Different logical relationships will be discussed later, with reference to other illustrative drawings.

For convenience, various system elements are represented by graphic symbols, as shown by the legend in the drawing. For example, a rectangle with a shaded section in the upper right corner represents a lighting fixture with one or more enhanced capabilities, or "enhanced fixture" (EF). Examples of enhanced capabilities may include increased memory, faster processor, a user interface component (e.g. gestural control sensor, microphone/speaker, video camera/projector, information display, etc.) and/or an integrated sensor for sensing a condition in relation to a lighting function or a condition for some other purpose not directly related to lighting or lighting control. Luminaires are represented by circles (L). Luminaires in this example are lighting fixtures or lamps that perform normal lighting functions but do not have the added capabilities of the enhanced fixtures.

Sensors (S) are represented by seven-pointed stars. The sensors may be of types that sense conditions directly related to lighting, such as lighting device output, ambient light or occupancy. However, as an alternative, any sensor represented by a seven-pointed star may be configured to detect some other type of condition that is not necessarily involved in lighting operations, such as sound, atmospheric conditions (e.g. temperature or humidity), vibration, etc. Other types of sensing for lighting control or other system functions include audio input, video input, electrical load sensing, etc.

In the drawing, each triangle symbol represents a user interface (UI) device. For lighting purposes, such devices are often referred to as lighting controllers. Examples of lighting controllers include ON/OFF switches and dimmers. For systems using more advanced lighting devices, user interface devices serving as the lighting controllers may also provide a mechanism for color selection of the lighting output(s). In a system such as that illustrated in the drawings, the user interfaces may provide input (and output) for the user in any convenient or desirable form, in relation to the lighting functions, in relation to other functions monitored or controlled via the system (e.g. HVAC and/or any industrial/commercial equipment running on the premises) and possibly for access to external information and/or controllable resources via the Internet. Advanced examples of user interfaces include touchscreen display devices as well as audio input/output devices, various other video input/output device; gestural input devices, etc.

All of the system elements in the rooms or areas of the premises, coupled together into the lighting system and network, have at least some communication capability. For example, some number of such devices communicate with each other via local physical communication links. Some of the system elements may serve as a hub for communication with some or all of the other devices. Also, as will be discussed in more detail below, in some rooms in our example, one or more of the fixtures, luminaires, user interfaces, or other elements in a particular room or service area also provide communications outside of the room or service area.

Selection of the element in an area that will provide the network connectivity to the LAN may be based on selection criteria as part of the commissioning of the equipment in a particular service area. For example, if only one element in a room or the like has the actual connectivity, that element is chosen by the other devices to providing the routing function. However, if two or more elements have the capability, one may be initially selected (for any appropriate reason), but then the other element takes over the routing function, for example, in the event that the first element may later fail, or be overloaded, busy, etc., or if the communication to/through the other element is better at a particular later time.

Alternatively, the equipment in a particular room or service area may include a gateway (Gw) hub, represented by a six-sided polygon (see legend) in the drawing. The gateway hub in this later type of example is a device that provides communications capabilities and is not itself configured as a device of one of the other types. A gateway hub may support communications capabilities to and from some or all of the other devices within the room or service area. In some examples, one of the other elements in the room or service area may support the communication outside the room or area. In other arrangements, the hub gateway provides the external network communications capabilities, although in some cases is does support the local intra device communications whereas in other examples the hub gateway does not support the local intra device communications. A gateway hub might also support other, non-lighting capabilities (e.g. memory, processing power, etc.).

The layout drawing of FIG. 2 also shows several other types of devices, represented by five-pointed stars and generally referred to as third party devices "PD" (see legend). These PD devices represent a general class of a wide range of other devices that may use the lighting system for communication purposes and may interact with elements of the lighting system. In some cases, these devices may themselves be 'lighting' related, such as lighting controllers, but manufactured by parties other than the vendor that manufactures the overall system and most of the components thereof. As another example, these devices may be controlled devices and/or user interfaces or controllers for other types of equipment, e.g. HVAC and/or any industrial/commercial equipment running on the premises, whether or not manufactured by parties other than the vendor that manufactures the overall system and most of the components thereof. As still further examples, the PD devices may be security system devices, building access control device, inventory control monitors, location/positioning devices (e.g. indoor "GPS") or any device using the lighting network as a communication backbone.

The drawing of FIG. 2 shows different physical network configurations for purposes of discussion. In many examples, similar areas or rooms (and possibly all areas of a premises) may utilize the same network configuration. The particular configuration used in common for some or all of the areas may be one of those shown or still a different configuration. The configuration used for a particular premises and/or a particular area of a premises can be selected based on cost and performance metrics of the entity that we utilize the premises, on cost and performance metrics of the entity (e.g. lighting vendor) that will install and maintain the system, or other reasons of one or more of the involved parties.

The equipment in the service areas represented by the various rooms 1-8 and any other lighting system service areas, such as the corridor 9, connect together with and through a communication network in the premises. In the example, the communication network in the premises takes the form of a local area network (LAN).

The drawing shows data communication links within a room or other service area as long-dashed lines and shows data communication links from the elements in the various network rooms or other service areas out to wider network(s) as lines with small dots. Both types of network links may utilize any convenient data communication media, such as power lines wiring, separate wiring such as coax or Ethernet cable, optical fiber or wireless (e.g. Bluetooth or WiFi). Some or all of the network communication media may be used by or made available for communications of other gear, equipment or systems within the premises. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system or may already be present from an earlier data communication installation.

Within one room or other type of service area, the system might use one, two or more types of communication media. Similarly, to interconnects equipment in various rooms or areas and in turn connect such elements into a broader network, the system may use one, two or more types of communication media. Use of multiple communication media, for example, might help to optimize bandwidth throughput, cost and/or security. As a more specific example, an application or function needing low latency communication between devices that are physically close may use one media for the local connection, but one of the devices at other times may need to send large amounts of data to a remote location for processing via a different wide-area media with faster data transport capabilities.

Also, in most of the examples the elements of one room may be networked together and connected to the broader area network, however, it some examples at least, in may be more effective to connect the elements in two or more rooms together and provide a connection thereof to the broader area network.

In the example shown, room number 1 includes an enhanced light fixture, two luminaires, a sensor (as a standalone device), a user interface device and a third party device. Each luminaire, sensor, interface device and third party device has a communication link within the room 1 to the enhanced light fixture. In such a configuration, to the extent that the luminaires, sensor, interface device and third party device communicate with each other within the room 1, the inter-device communications within the room go through the enhanced light fixture. The enhanced light fixture also communicates with the luminaires, sensor, interface device and third party device within the room 1 over the illustrated data communication links. In the exemplary configuration shown in room 1, the enhanced light fixture also couples to a link of/to the LAN, to enable the various devices in room 1 to communicate with other devices of the system and with outside networks, via the LAN.

Room 2 in the drawing includes elements similar to those in room 1. Physical networking for communications between the devices in room 2 is also similar to that implemented in room 1. Hence, the example of room 2 shows communications of the luminaires, sensor, interface device and third party device within the room 2 with the enhanced length fixture and, through the fixture, communicating with each other. However, system elements other than the enhanced light fixture can provide the communications with the broader area network. In the example of room 2, the sensor is configured to provide a coupling to a communication link to the broader area network provided by the LAN. The other type of system element providing the coupling to the LAN may be a luminaire, a sensor, an interface device or a third party device or a gateway device.

In the example shown, room number 3 includes an enhanced light fixture, three luminaires and a user interface device. In this example, the luminaires and the enhanced light fixture communicate over the in-room media with the user interface device, and through that device, communicate with each other. The user interface device in this example provides a coupling to a communication link to the broader area network provided by the LAN.

The example of room 4 includes an enhanced light fixture, three luminaires, a standalone sensor and a user interface device. The elements in room 4 communicate with each other via a mesh network arrangement. As represented by the dashed lines in room 4, each of the devices in that room communicates directly with one or more of the other devices in that room. One of the devices in the room is able to connect to the broader area networks, in the example, to the LAN. By way of a specific example, in room 4, the coupling to the LAN is through a normal luminaire L.

In the room examples discussed so far, one of the devices provided for normal purposes in each room (e.g. any one of an enhanced light fixture, a luminaire, a sensor, a user interface device, or a third party device, in any room) provided the coupling to a link to the LAN. However, in other arrangements, such devices may not fully support all of the desired communications. Hence, a hub gateway device may be added, to support inter-device communications within a room or area and/or to provide a coupling to a communication link to the LAN (and/or to a WAN). Rooms 5-7 show several exemplary room or area configurations that utilize such a gateway hub.

Room 5 includes a third party device, a user interface device, a sensor, three luminaires and an enhanced light fixture. In addition, room 4 includes a hub gateway. In this first hub-based example, the other elements in room 5 all communicate with the hub gateway element, and through that element, communicate with each other. As such, the networking in room 5 forms sort of star network, with the hub gateway at the center of the star. Of course, other physical networking arrangements may be used for the communications of the hub gateway with the other system elements in the room. In the networking arrangement shown in room 5, the hub gateway also provides a coupling to a communication link to the LAN.

Room 6 similarly includes a third party device, a sensor, three luminaires and an enhanced light fixture; and the room includes a hub gateway to facilitate communications. In the example of room 6, the hub gateway supports communications among the various system elements within the room. The other elements in room 5 all communicate with the hub gateway element, and through that element, communicate with each other. Although other network media connection or coupling arrangements may be used; in the example, the networking in room 6 forms sort of star network, with the hub gateway at the center of the star. As noted in earlier discussions, any of the elements, such as the enhanced fixture, a luminaire, the sensor, a user interface device or a third party device may be configured and linked to support the communications of the elements in a particular room or service area with one or more broader area networks, such as the LAN in our example. In the configuration shown in room 5, the sensor is configured to provide a coupling to a communication link to the broader area network provided by the LAN.

As noted earlier, rather than system elements in each room connecting only to each other and having a coupling or link for the room to the LAN; another approach is to have elements in or associated with two or more rooms or lighting service areas connected together into a somewhat larger local network with one coupling thereof to the broader area network, in our example, the network forming the LAN. This point is illustrated by rooms 7 and 8 in the example of FIG. 1. Room 7 includes a user interface device, a sensor, three luminaires and an enhanced light fixture; and the room includes a hub gateway to facilitate communications. In the example, the networking in room 7 forms sort of star network, with the hub gateway at the center of the star, although other arrangements may be used. The other elements in room 7 all communicate with the hub gateway element, and through that element, communicate with each other.

Room 8 similarly includes a third party device, a user interface device, three luminaires and an enhanced light fixture. Various techniques may be used to network the elements in room 8 to the elements in room 7, for communication purposes. In the example, two of the luminaires in room 8 have respective links to the hub gateway in room 7. Other elements in the room 8 communicate through those luminaires with the gateway in room 7. Such an arrangement of communication links allows the various system elements in room 8 to communicate with each other as well as with the elements in room 7 and with the LAN.

The layout drawing illustrates communications networking. Power circuitry may be configured differently. For example, several offices may be on the same network, such as shown in rooms 7 and 8. However, the power and logical control for lighting and the like may be separate, as represented by the lighting control functions offered by the user interface devices in the two individual rooms 7 and 8. Stated another way, although linked for communications, a user in room 7 could operated the interface in that room to turn ON/OFF, dim or otherwise adjust the lighting in that room, independently of control of similar or other control of lighting or other functions in the room 8 by a user in room 8 operating the interface in room 8. Examples of such multi-space arrangements include different cubicles in an otherwise open office space, where the individual controls allow occupants some degree of individual control over conditions in their cube as well as a re-configurable conference room that may be configured as one large conference room or divided by retractable divider walls to form two or more smaller conference rooms.

The drawing also shows an example of a physical network configuration for a somewhat different type of space serviced by the lighting system/network. In the example, the additional or different type of space is a hallway or other type of corridor 9. Various devices may be provided in the corridor 9, for lighting and other purposes, which also use the communications provided with the lighting system. In the simple example shown in the drawing, the corridor 9 includes three luminaires, an enhanced light fixture and a third party device. Again, various physical media and communication configurations may be used for the networking in the corridor 9. For an elongated corridor like that in the illustrated example, it may be most efficient to connect each device to the next device down the corridor, in a fashion that appears somewhat serial in the drawing, although the network connectivity provided through the devices may or may not be serial. One approach, for example, might implement a daisy chain arrangement, whereas another approach might rely on internal connectivity between ports on various system elements in the corridor 9 to combine the links to form a bus; and still other networking configurations might be used even with the device-to-device arrangement shown in corridor 9. The end device in the corridor, such as one of the luminaires in the specific example depicted in corridor 9, provides a coupling to a communication link to the broader area network provided by the LAN. Such an arrangement of communication links allows the various system elements in corridor 9 to communicate with each other as well as with the elements in room 7 and with the LAN.

As outlined earlier, the various links may be wired, optical fiber, radio wireless, or optical wireless or any other suitable communications media (e.g. audio). Mesh implementations like that in room 4 involve communication of each element on the mesh network with other elements (potentially with all other elements) within the mesh. Whereas star configurations as shown in other rooms involve communication through a hub or other element configured as a router or the like. Even in the mesh configuration, however, one of the elements may be configured as a data switch or router for communication with/via the LAN. As shown by the various examples, however, various elements of the lighting system that serve other system purposes may serve as the router or switch for LAN connection and/or as a router within a room or area network; or a hub gateway may be included within a room or other service area of the system to perform any routing of data switching functions needed to support a particular chosen or optimum physical network configuration for a particular premises or portion thereof.

In a wireless arrangement, e.g. using WiFi within a room or area, the hub gateway or other element serving as the router may take the form of or include a wireless access point with associated Ethernet connectivity to the LAN with an appropriate integrated router functionality. Where wired Ethernet is used for the connectivity within a room or other service area, the hub gateway or other element serving as the router may take the form of or include an Ethernet router. Ethernet and WiFi type wireless Ethernet are used here by way of example, only; and other types of communication media and corresponding access and routing devices may be used.

The LAN in our example is a building, campus area or enterprise wide private network. The LAN may use any networking technology and/or media suitable to the particular premises and the needs or operating desires of the entity or entities that will utilize the premises. The LAN or other such network also provides communications connectivity to a wider area network, such as an intranet between buildings or campuses and/or the public Internet, as generally represented by the wide area network (WAN) in the drawing.

Separate from the physical networking configurations are various logical relationships among the system elements. For example, although generally similar in many respects, one of the devices in a room or other service area may be configured as a 'leader' unit whereas other system elements in the particular room or other service area may be configured as 'follower' units with respect to the designated leader. These relationships, however, are relatively dynamic and readily configurable. For example, programming of the devices/elements in the system provide automatic/autonomous discovery at installation; and an initial set-up routine uses results of the discovery process to set-up logical relationships between devices, for example, including selection of a device as a leader unit. However, at a later time, if the leader unit is impaired or off-line, the network is self-healing in that some or all of the set-up routine can be run again to select a replacement as a new leader unit from among the other devices that are operational on a particular part of the network. Alternatively, the system may have "fallback" plan in place, in which one or more other elements are pre-designated to take over the role of the leader in the event of failure or impairment of the initially selected leader. Effectively, such an arrangement may identify a first in command (leader), a second in command, etc.

Figure 3:
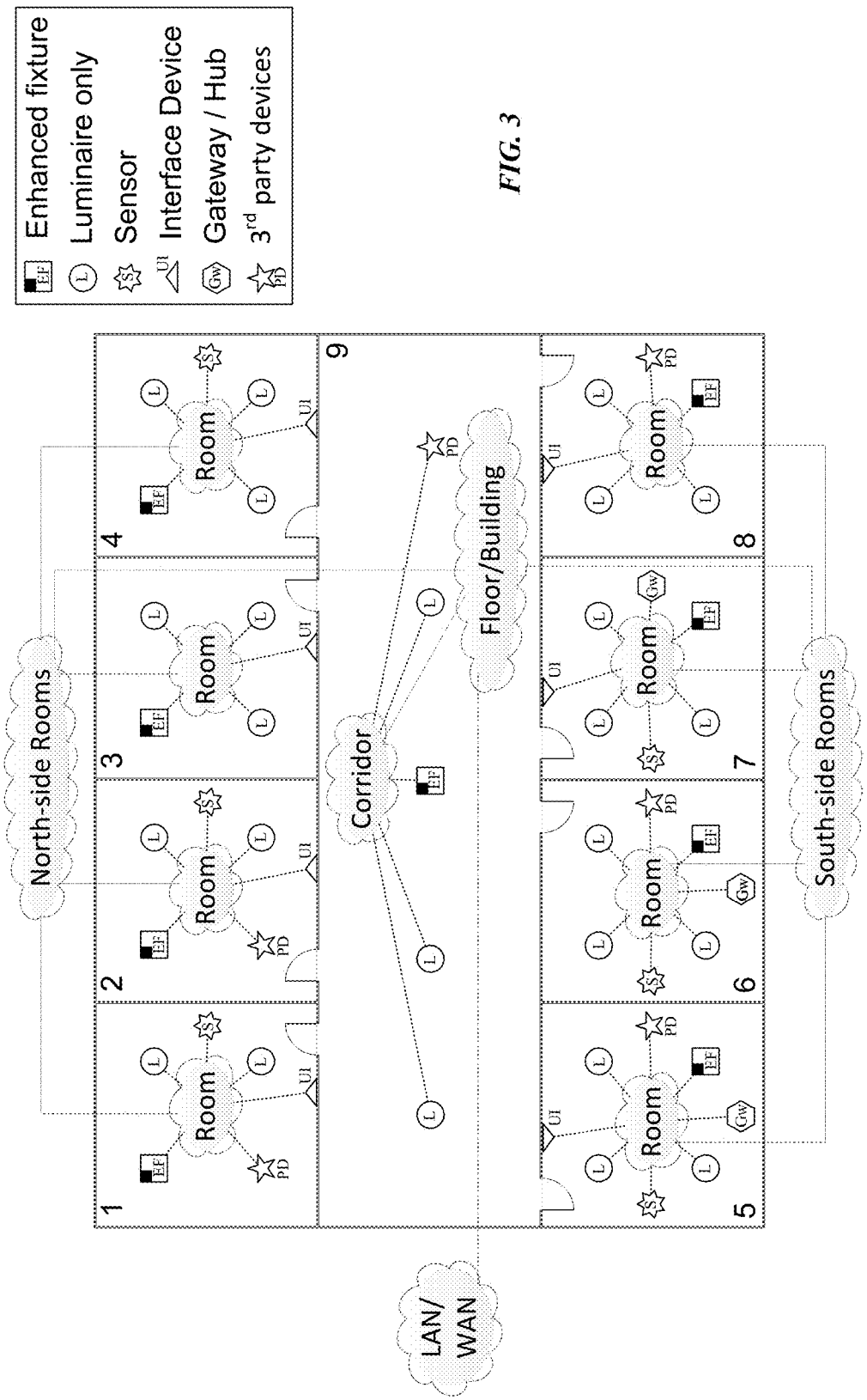
FIG. 3 is a layout diagram of the simple example of a portion of a building with an overlay of lighting system elements, similar to FIG. 2, but showing a first set of logical associations of system elements that may be implemented in a system like that shown in FIG. 1.

Each element communicating via the premises networks that form part of the lighting system have one or more addresses or identifiers, to facilitate communications via the particular media used for the networking and/or to identify each device to other devices on the system or outside the system with which each device may communicate. For example, if Ethernet is used, each device may have a media access control (MAC) address assigned to the Ethernet interface within the respective device. Each device may also have an Internet Protocol (IP) address assigned thereto. Depending on the interface of the LAN to the outside world, each device may have an internally assigned IP address, which a firewall or network address translation (NAT) device translates as appropriate when the device communicates via the WAN. If a device communicates with the WAN more directly, it may receive an IP address that is useable on the WAN, although if the address space is still that of IPv4, such an address would likely be assigned on a dynamic basis only for as long as the particular device in the premises may need the address. Each device will also typically have some form of electronic serial number for identification purposes, although there are a variety of different types of such identifiers that may be used for some or all of the devices that communicate via the illustrated system and its network media. Another approach might utilize cellular network type addressing and identification, in which case, each device might have an assigned cellular telephone number and an electronic device identifier such as an International Mobile Subscriber Identity (IMSI) or the like The premises may include a LAN or other on-premises network, or the communications may go directly to the particular WAN. Alternatively, there may be a LAN or other network formed within the premises, but without a coupling or connection to a wider area network, for example, to restrict access and therefor increase security of the lighting network and the like within the premises. The LAN/WAN combination of FIG. 3 provides communications capabilities inside and outside the premises in a manner analogous to the network 51 in the example of FIG. 1. Depending on the network media and protocol(s) used, the LAN may include a frame switch, a packet router or the like providing LAN interconnectivity. Although not shown, a gateway or the like may also be deployed on the LAN to provide various functions in support of interconnectivity of the LAN to/from the WAN.

The LAN functionality, however, may essentially be embedded in the room or area elements, except for the interconnecting media. For example, any of the system elements in each room or other service area may provide connectivity and switching/routing functions to interconnect the system elements via the applicable media to form a LAN on the premises 12. Also, one of the elements in a room or area may provide the interface to any external WAN. Hence, although shown separately for convenience, the elements that form the LAN may be integral with the lighting devices, etc. of the lighting system in the rooms or other types of areas serviced by the illustrated system. Alternatively, all intelligent system elements may connect directly to the WAN. If the elements all connect through the WAN to a "cloud" service, the communication between elements could occur via exchange through the cloud server.

The WAN communication capability, particularly if the WAN is a relatively public network such as the Internet, may allow various parties to access the lighting network and the system elements that communicate via the network. For example, the enterprise or other entity that operates the premises may access the system remotely. Also, a provider of some or all of the lighting system equipment and network may access the element or elements of the system that they provide, e.g. for monitoring, maintenance or other system service.

The LAN as discussed here need not be a LAN of the type typically used today for computer or mobile device communications within a particular premises, although the lighting system may use or connect to such a network. For purposes of the present discussion, the LAN is a premises network for data communications among the elements discussed herein as part of the lighting system and/or using the associated networking capability of that system for communications within the premises.

The hub gateways or other elements of the overall system that provide the router functionality may be linked together, for example, to form or help to form the LAN. The hub gateways or the like may be implemented utilizing available network components.

Although not shown, there may an additional layer of networking and/or control, between the LAN and the WAN. For example, an enterprise having a wide geographical operation at multiple locations may have LANs at each building or campus and a enterprise-wide intranet interconnecting those locations. If desired (and security is not an issue), the enterprise-wide intranet would provide the access/connectivity to the Internet. For enterprise monitoring and control, the enterprise-wide intranet would facilitate communications for other servers and/or user terminal devices of enterprise personnel to communicate with the equipment at each location that is on the respective lighting network LAN.

The discussion to this point, particularly relative to FIG. 2, has focused mainly on various types of physical networking that can be used in and/or provided by a lighting system of the type under consideration here. In addition to physical networking, such a system associates various elements/components of the system in a number of 'logical' ways. Logical associations allow elements to be linked together, for example, based on a control grouping, based on similar properties, based on proximity, a variety of other criteria and/or combinations of any or all such properties. As one example, devices within one room or other type of service area that are to be operated in some unified manner (e.g. to light the room or area) may be linked together in one logical grouping. All of the wall controller type user interface devices in a building might be logically linked in one grouping to offer the ability to create an overall view of the lighting operations users have selected throughout the building. As another example, all sensors (or all sensors of one type) may be linked together in a logical grouping to allow reporting of one or more detect conditions on an overall basis across the premises or some portion (e.g. one floor) thereof.

Also, logical networks may be networked together for some purposes, so that a function of one logical network may influence an operation within another logical network. For example, if enough controllers indicate that lights have been turned to a particular level, other lights not to that level yet in other rooms areas may be similarly adjusted. One or more linked networks can affect each other and possibly still other logically networked elements. For example, if >x % of the occupancy sensors in an area or space (e.g. floor or building), then the space is considered "unoccupied." If >y % of the lights are OFF, then the enterprise office formed by the space is considered "closed." If the space is both "unoccupied" and "closed," then the system can turn down the HVAC for the space and turn ON the security system.

As outlined above, various elements of system 10 within a particular premises 12 (FIG. 1) can be provisioned in a variety of ways to suit different system objectives. Provisioning generally establishes capabilities of elements to communicate with each other via the particular media in service areas and throughout a particular premises, and through that networking, with an outside network (if desired). Configuration sets up various elements of the system 10 in logical groupings, where different groupings support different ones of the system functions. Logical associations or groupings into sub-networks may be based on various parameters.

Figure 4:
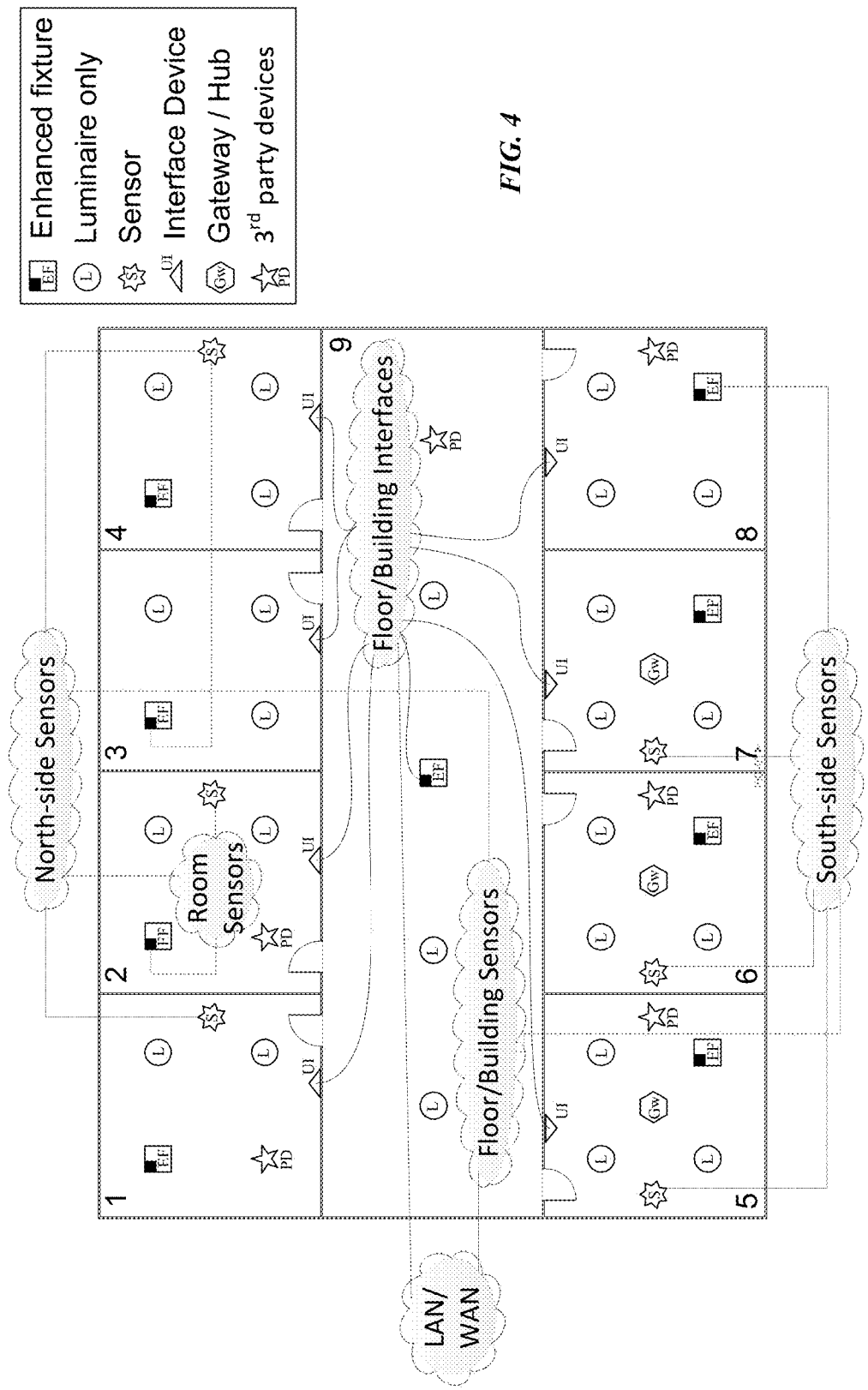
FIG. 4 is a layout diagram of the simple example of a portion of a building with an overlay of lighting system elements, similar to FIG. 2, but showing another set of logical associations of system elements that may be implemented in a system like that shown in FIG. 1.

It may be helpful at this point to consider some examples of logical configurations. As discussed earlier, FIG. 2 shows examples of physical networking in a simple example of a building (or portion of a building) as a premises where a system like that of FIG. 1 may be installed. Communications via such networking is facilitated by the element provisioning, e.g. storage of provisioning data in the appropriate system elements. FIGS. 3 and 4 show the same building, with the same lighting system elements installed in the rooms 1-8 and corridor 9 of that building. However, where FIG. 2 depicted a physical network overlay on the floor plan, FIGS. 3 and 4 show logical networks or groupings of system elements as overlaid on that same floor plan. The logical relationships of FIGS. 3 and 4 are facilitated by the element configuration, e.g. storage of configuration data in the appropriate system elements.

FIG. 3 illustrates several different types of logical associations into sub-networks, based on element locations and/or proximity. Some aspects of location may be known, e.g. based on element location data stored in the device and/or stored in a central overseer functionality. Proximity may be determined from known location of the different system elements. Alternatively, relative proximity of lighting devices may entail detection by light transmission and light sensing. For example, a sensor (S) for detecting light or an light fixture (EF) enhanced by inclusion of a light sensor therein may detect light from one or more other luminaires or enhanced fixtures within the respective service area or detectable via a doorway or the like. To identify different light emitters, each lighting device may modulate its output in an identifiable manner, e.g. with an identification code for a short periodically recurring interval or during a set-up (or re-set) operation.

As a first example, the various system elements within each of rooms 1 to 8 are grouped or associated to form a logical sub-network in the respective room, as represented generally by the "Room" network cloud shown in each of rooms 1-8. Similarly, the various system elements within the corridor 9 are grouped or associated to form a logical sub-network in corridor 9, as represented generally by the "Corridor" network cloud. The service area (room or corridor in this simple example) type sub-network configurations, for example, may facilitate unified lighting control, e.g. in response to inputs via a lighting controller (UI device in the examples) and/or one or more sensors in each respective room.

However, such sub-networks and the elements in such sub-networks can then be logically associated. In the example, the various system elements within each of rooms 1 to 4, that is to say, the elements of the room networks in those first four rooms, are grouped or associated to form a logical sub-network for the rooms on that side of the building, as represented generally by the "North-side Rooms" network cloud. Similarly, the various system elements within each of rooms 5 to 9, that is to say, the elements of the room networks in those other four rooms, are grouped or associated to form a logical sub-network for the rooms on that side of the building, as represented generally by the "South-side Rooms" network cloud. The building side sub-network associations may facilitate some operational function that is coordinated based on the side of the building. For example, if ON, lighting intensity in rooms on a side of the building may be adjusted in a coordinated manner based on time (day of the year and time of day), e.g. so that the lighting adjusts for expected differences in outside lighting entering rooms on a particular side of the building. As another example, if a cloud starts passing a shadow sequentially across multiple rooms, rooms later in the sequence of shadow passage might be able to predict and therefore prime the systems in those rooms to minimize the disruption.

Logical association can also be used to group system elements into one or more still larger area sub-networks. In the example, all of the system elements in the various rooms 1-8 as well as the system elements in the corridor 9 also are associated in a floor or building sub-network, as represented generally by the "Floor/Building" network cloud. This wider sub-network association may facilitate coordinated functions across a wider portion of the premises, i.e. across all of the rooms and the corridor in our simple example. For an enterprise that closes at a particular time, for example, all lighting except emergency, security and/or exit lights throughout the floor/building network may shut down at a set time shortly after the designated closing time, when all employees of the enterprise are expected to have departed the premises. As another example, in an emergency (detection of a fire or the like), the lighting in all of the rooms may come on at once whereas the lights in the corridor might flash in a coordinated sequence to lead people to the emergency exit from the space.

In these examples, the various logical associations are implemented based on configurations for particular operations, regardless of the physical networking used in the various service areas of the premises. Consider rooms 7 and 8 by way of an example. As shown in FIG. 2, communications for the system elements in room 8 are routed through the gateway hub (Gw) in room 7. However, as shown in FIG. 3, the system elements in room 7 are logically associated in one individual room-lighting sub-network, and the system elements in room 8 are logically associate in another individual room-lighting sub-network. In the configuration of FIG. 3, the logical groupings relative to rooms 7 and 8, for example, allow the UI device serving as a lighting controller in room 7 to control the operations of the luminaires (L) and the enhanced lighting fixture (EF) in room 7 and allow the UI device serving as a lighting controller in room 8 to control the operations of the luminaires (L) and the enhanced lighting fixture (EF) in room 8. The sensor (S) in room 7 may influence lighting functions of the luminaires (L) and the enhanced lighting fixture (EF) in room 7. If the enhancements of the enhanced lighting fixtures (EF) include sensors, the sensor in the enhanced lighting fixture (EF) in room 7 influences lighting functions of that fixture and/or of the luminaires (L) in room 7, whereas the sensor in the enhanced lighting fixture (EF) in room 8 influences lighting functions of that fixture and/or of the luminaires (L) in room 8.

Although the additional grouping is not shown, the elements in the two rooms 7 and 8 may be associated together in yet another logical sub-network. For example, if the two rooms are parts of a conference room separated by a moveable partition, the two groups might work together (via a third grouping that encompasses elements in both rooms), e.g. when the partition is open to join the two rooms into one large conference space. The opening of the partition may be recognized by sensing of position or configuration of the partition or by sensing of appropriately modulated light emitted from a lighting device L or EF in one room by a sensor S (or a sensor in an enhanced fixture EF) in the other room. The opening of the partition may be detected by establishment of any other type of detectable connection through an appropriate communication media (e.g. any type of signal that is substantially attenuated or blocked by the presence of the partition, and strong when the partition is removed). When open, either one or both of the UI devices functioning as a lighting controller but located in room 7 or room 8 may control all of the luminaires (L) and enhanced lighting fixtures (EF) in both rooms 7, 8 in a unified manner. When the partition is later closed, operations of the system elements in the two rooms 7 and 8 would revert to independent lighting operation based on the two logical groupings for those rooms as illustrated by the sub-network clouds in rooms 7 and 8 in FIG. 3.

One layer of provisioning and logical configuration implemented by the exemplary commissioning process includes logical association of system elements based on location or proximity, for example, within a lighting service area such as a room or corridor. It may be helpful to consider an example of such a commissioned set of system elements, particularly the resultant operation thereof, in a bit more detail. A room 4 (FIGS. 2 and 3) having elements configured in a 'Room' network (FIG. 3), for example, has three luminaires (L), and enhanced light fixture (EF), a user interface (UI) device at least set-up as a lighting controller and a sensor (S). For purpose of discussion of this example, we will assume that the sensor (S) is an ambient light sensor, and that the enhanced of the fixture (EF) involves at least the inclusion of an occupancy sensor.

As a result of a network discovery step in the commissioning process, all of the system elements L, EF, UI and S in the room 4 are provisioned to communicate with each other to the extent as may be appropriate for Room network operations. The system elements also are logically configured by the other steps of the commissioning process, as appropriate to implement respective functions for lighting service in the room 4. For example, the lighting controller/UI device will have stored the identifications and information as to respective capabilities of at least the lighting devices L and EF in the room that the device UI will control for the lighting service. The enhanced fixture (EF) will have stored the identifications and information as to respective capabilities of the user interface (UI) device and the ambient light sensor (S). Each luminaire (L) will have similarly stored the identifications and information as to respective capabilities of the user interface (UI) device and the ambient light sensor (S). In addition, each luminaire (L) will have similarly stored the identification and information as to the capabilities of the enhanced fixture (EF), so that each luminaire can receive and respond to occupancy sensing information from the enhanced fixture (EF). Conversely, the enhanced fixture (EF) will have stored the identifications and information as to respective capabilities of the luminaire (L), at least to the extent necessary to enable the enhanced fixture (EF) to notify the luminaire (L) of occupancy states of the room 4.

As a result, if a person enters room 4 and activates the UI device when the room lighting is OFF, the UI device will respond by sending turn ON commands through the network media to the lighting devices L and EF in the room. The lighting devices L and EF in the room will receive the command and turn their respective light sources ON. The occupancy sensor function of the fixture EF will also indicate an occupied room state and the fixture EF will notify the luminaires (L) of that state by transmitting appropriate messages through the room network media to the luminaires (L). The sensor (S) will also detect ambient light intensity and notify the lighting devices L and EF in the room through the network media, and the lighting devices L and EF will adjust the output intensities of the light sources accordingly. If the person later leaves the room 4 without turning the lights off via operation of the user interfaced (UI) device, this change can be detected by the occupancy sensor function of the fixture EF, and the fixture EF will send notifications thereof through the room network media to the luminaires (L). If the unoccupied state persists for some period of time, e.g. 10 minutes, the lighting devices L and EF in the room will turn their light sources OFF.

The On/Off lighting example described above with respect to room 4 and the system elements in that room is given by way of a simple illustrative example of operations of a portion of the system 10 that may be implemented using the provisioning and configurations of the type automatically established via a commissioning process, more detailed examples of which will be discussed later. The system 10 and the commissioning thereof, however, may support a wide range of other types of operations for lighting control and other services that may be implemented or at least controlled in whole or in part via the system 10 and its communications capabilities.

The sub-networks shown in FIG. 4 represent just a few examples of logical associations based at least in part on functionality of particular elements logically included in the sub-networks. Consider the sensor functionalities of the illustrated system elements for initial discussion on this point.

The sub-network associations in the examples of FIG. 3 were based mainly on location and/or proximity relationships. For example, elements in a particular room or corridor were grouped together, elements in rooms on a particular side of the floor or building were grouped together, and system elements located within the particular floor or building were grouped together. The commissioning techniques under consideration here, however, can also logically associate elements of a system like system 10 of FIG. 1 into groupings of sub-networks based on other relationship parameters. FIG. 4 illustrates the same simple building layout as used for FIGS. 2 and 3 but overlaid with logical sub-networks formed among the elements based on several other exemplary relationship parameters.

In general, all sensors may be identified as members of a particular 'sensor' group or sub-network. As another example, sensors of a particular type, e.g. all temperature sensors, may be associated in one group. As another example, sensors in a selected portion of the premises, e.g. in rooms along one side of a building, may be associated in a group.

With specific reference to FIG. 4, all of the system elements that are or incorporate sensors (sensors S and light fixtures (EF) enhanced with sensors) are logically associated in a sensor sub-network for the entire building or floor represented generally by the "Floor/Building/Sensors" network cloud in the drawing. Smaller groups of sensors, however, also are associated into other sensor sub-networks based on location as well as the fact that the elements in the sub-network are or have sensors. In the example, the various sensors or other system elements having sensors within each of rooms 1 to 4, that is to say, the sensors and light fixtures (EF) enhanced with sensors located in those first four rooms, are grouped or associated to form a logical sub-network of sensors for the rooms on that side of the building, as represented generally by the "North-side Sensors" network cloud. Similarly, the various sensors or other system elements having sensors within each of rooms 5 to 9, that is to say, the sensors and light fixtures (EF) enhanced with sensors located in those later four rooms, are grouped or associated to form a logical sub-network for the rooms on that side of the building, as represented generally by the "South-side Sensors" network cloud.

The sensor sub-networks may facilitate reporting of sensor detection information throughout the building or just from one or the other North/South sets of rooms, to some higher level monitoring or control functionality via the LAN/WAN network. For example, such data may be provided to a central lighting system control. As a another example, such sensor data may be reported off-premises to an entity monitoring or servicing the premises for some purpose or to some third party entity (e.g. the power company or NOAA) that may utilize the data for its own purposes.

The drawing also shows a logical association of all of the user interface (UI) devices within the building of floor into a Floor/Building Interfaces sub-network. Such sub-networking may allow various interfaces, typically serving as lighting controllers, to inform each other of status of the lighting in the various services areas of the premises, e.g. so that lighting may be turned ON in one or more specific rooms when lighting is first turned on in the corridor near a general entry doorway from the outside (upon first entry into the floor or building before or at the start of business hours). The Floor/Building Interfaces sub-network may also facilitate reporting of lighting status in the various service areas to a central point, which may be within the premises or outside the premises.

A UI grouping, for example, may be utilized to send broadcast messages to occupants. In the case of emergencies, the alarm system may send a message to the UI group. Each UI device may communicate the nature of the emergency, where the emergency is located relative to each room, how to respond, location of nearest clear evacuation routes, etc. The UI grouping may also be useful for redundancy. For example, in an emergency, the system may attempt to distribute the emergency alert message through multiple logical networks to maximize the probability that the correct response is initiated by as many of the occupants and devices as possible.

A variety of logical groupings or sub-networks that may be useful in various lighting system installations have been discussed relative to FIGS. 3 and 4. In the commissioning process, a particular element will hear from any number of other system elements. The commissioning process will allow the particular element to establish logical associations, essentially defining one or more groupings or sub networks to which the element will belong. As a result, the particular system element will store identification and capability information about one or more other system elements helping the particular element to define its membership in the sub network(s) it is affiliated with. The retained data may include data for all other members of each respective sub network.

Alternatively, the retained data may not include data for all other members of a group, in at least some circumstances. For example, a lighting device may not store identifications of all of the other lighting devices in its local proximity group for a particular service. Instead, the lighting device may only store information identifying the one lighting controller to which it is intended to respond. If the device group for a particular service area will be configured in a leader follower arrangement, the device designated as the leader restore identification and capability information about all of the follower devices in the particular group. A follower device, however, may retain identification information for the designated leader device.

The discussion of FIG. 1 provided a general overview of an exemplary system, and the FIGS. 2-4 outlined examples of various physical and logical relationships that may be used in or implemented with such a system. As indicated at several earlier points in the discussion, much of the set-up of the physical and/or logical relationships can be established as part of a commissioning procedure. Hence, it may be helpful to consider a first relatively simple example of an applicable process flow, with reference to the flow chart of FIG. 5. The procedure here involves network discovery as well as exchange of identification and capability information among system elements on the network(s). Information is processed to determine neighbors and then to configure an element (the element performing the self-configuration processing) to set-up one or more logical associations of that element into a group or sub-network (or a plurality of groups or sub-networks) with its neighbors and/or with still other elements of the lighting system.

Figure 5:
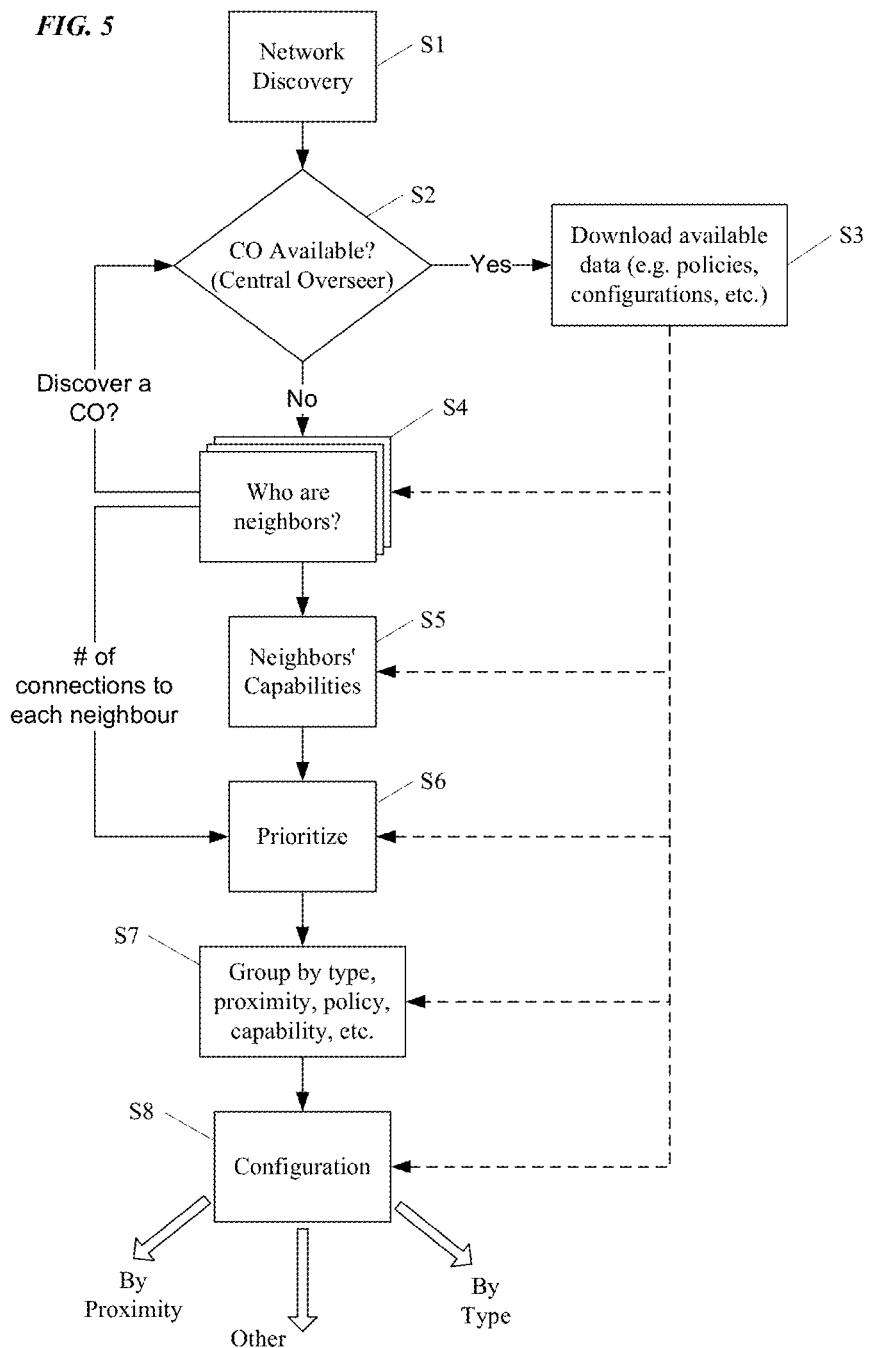
FIG. 5 is a flow chart of a simple example of a procedure for self-commissioning by a lighting device or other intelligent system element in a system like that shown in FIG. 1.

The discovery and self-commissioning procedure thus utilizes information inherent in or initially known in the element as well as information that is gathered or acquired by the intelligent system element that is performing a discovery and self-commissioning operation like that illustrated in FIG. 5.

Initially, at set-up by the manufacturer before installation of a particular element of the system, any of the intelligent system elements would have certain information pre-stored therein. For example, the element would store its own identification. It would also have stored data so that the 'brain' of the element knows its own inputs and outputs, at least in its initial arrangement as supplied by the manufacturer (e.g. before later additions or modifications at the premises). For example, a lighting device would know the input commands it needs to control its operations as well as the controllable parameters of its light output, e.g. ON/OFF, dimming color adjustment, etc. If an audio interface is provided, the lighting device would know information as to the microphone and/or speaker and associated signal processing that provide audio input and/or output. If video output is provided in an enhanced light fixture, it would have stored information about the projector or display device included or to be driven by the fixture. If visible input is provided, the 'brain' of the light fixture would have appropriate information stored in its memory, identifying the camera input of the like and any signaling protocols needed for its interaction with such a component. At least for the autonomous commissioning operations, each intelligent system element would also store information about the element's own capabilities, such as communication capabilities (e.g. hardware interface(s) and protocol(s)), memory capacity, processing capacity.

Device capability information pre-stored in a particular system element may also include information about the element's various modes of operation. For example, for a lighting device, such information may identify a daylight harvesting mode in which a substantial amount of light in a service area is to be provided from outside the area while electric illumination in the area is diminished accordingly, and a regular illumination mode in which most illumination is to be provided by the lighting device (alone or in combination with illumination from other lighting devices illuminating the particular service area).

As part of the commissioning process, each intelligent system element also gathers information from other elements with which it communicates during that process. For discussion purposes at this point, we will describe the other elements communicating with a particular system element during the commissioning process as "neighbors," although that term as used here does not necessarily connote any particular degree of proximity. The information gathered from neighbors identification and capabilities information of each of the other neighbor elements. Depending on the capability of the elements, it may also be able to obtain at least some information as to relative proximity, e.g. based on strength of a communication signal or of a detected light signal.

Some provisioning and/or configuration data may be manually input, under at least some circumstances. However, in the autonomous procedure, the learned data may be obtained from a central repository, e.g. a central overseer function if available and already commissioned, or the learned data may be obtained from communications with the neighbor system elements.

An element may obtain group data. For example, it may learn if there are other similar elements operating on the system; or an element of one type (e.g. sensor) may learn that there are a substantial number of elements of another type (e.g. lighting devices) operating on the system.

The element also learns or processes the received data to determine aspects of relationships. For example, if the element is a lighting device, it may learn identification of and information about capabilities of any sensors and/or user interface devices within its vicinity.

With specific reference to the flow chart of FIG. 5, a system element executing a self-commissioning procedure will initially perform a network discovery step S1. The element may detect the physical network media and may exchange identification data with other elements on the particular network media. The network discovery process may depend on the physical media and/or the applicable networking protocol. If the element needs an address or identifier for communication on the particular network media, and it does not yet have that address or identifier stored therein, it will receive and store the requisite address or identifier. If Ethernet is used for example, the Ethernet interface within the element will typically be pre-configured with a MAC address for the data link layer of the applicable communication protocol stack. If needed for system and/or element operations for the network layer of the applicable communication protocol stack, an IP address may be assigned to the element by the network/system. The IP address may be provided to the element as a statically assigned address, e.g. as part of the network discovery in step S1. In other system arrangements, however, the IP address may be assigned only on a dynamic basis as (and for as long as) needed by the element.

As a result of initial set-up and/or the network discovery step S1, the element will have stored therein sufficient provisioning data to enable the element to communicate via the network within the premises 12, at least within some range (e.g. with the system element performing the router function for the particular service area within which the element will operate). In many network arrangements, the provisioning data will enable the particular intelligent system element to conduct communications with other system elements at the premises 12, at least at the network layer of the applicable protocol stack, e.g. so that the device seeking commissioning can communicate with most if not all of the other elements of the system 10 at the premises 12 for commissioning purposes. For example, if the networking of the system utilizes IP packet communications, the intelligent system element will be able to send and receive IP packets via the LAN portion of the system, throughout the premises 12 (although a gateway, firewall or the like may prevent communications via the outside network unless and until commissioning and associated permissions are set-up for the element).

At step S2, the element communicates with other elements accessible via the network to determine if any of the other system elements with which it can now communicate is configured as a central overseer (CO) service, at least with respect to the functions of the particular type of device. For purposes of commissioning, the CO service stores accumulated data about the system and its elements, which may be useful in commissioning the new element. Hence, if the element can identify an available and appropriate CO service (the Yes branch at decision step S2), the processing branches to step S3. In step S3, the element implementing the commissioning procedure receives a download of available data from the CO service, such as applicable policies (e.g. operational, communication, security, etc.), configuration data, available groups, neighbors, programs (e.g. color shows, installation specific commands, etc.), etc.

Depending on the particular information provided by download from the CO service, processing from step S3 may jump down to or skip over some or all of the later steps or may provide partial information at one or more of the later steps.

At step S4, the particular element that is executing a self-commissioning procedure communicates with other elements to identify accessible other elements (shown as multiple iterations of step S4) and processes the resultant information to determine which other elements are to be considered as its neighbors. The element communicates with other elements on the system via one or more communication links with the other elements and can analyze results of such communications over one or more links (as represented by the multiple boxes/iterations of S4 in the drawing) to identify neighbor relationships. As depicted in the earlier examples, the intelligent system elements communicate data with each other using their communication interfaces, the data communication media deployed in the service areas of the particular premises 12 and the elements forming the LAN at the premises. In addition, at least some elements may be able to communicate with each other over different links using additional transmitting and receiving equipment. Light sensors, for example, may be used to receive communications from elements modulating their light sources or from elements utilizing additional light transmitters (e.g. transmitting IR) An enhanced light fixture with a light sensor, for example, may be able to determine number of connections (e.g. light and communication link) and strength of some or all of the connections it has with another lighting device via light communications and network communications. If RF is used for the data communications, an element may also be able to detect strength of signals received from nearby transmitters.

Whether a device is a 'neighbor' for operational purposes can be determined from prioritizing information and/or from determining relative influence (e.g. based on a scoring algorithm). Relative trust that a particular element should be considered a neighbor for a particular grouping can then be based on the scoring of detected elements. The scoring function may include a time element, which may be useful for security verification. For example, a device's connections and influence should be stable over time, so any rapid change may indicate a security breach or other malfunction, and therefore trustworthiness may be lower.

Spatial location data, if available, may also be used to determine which other elements to consider as neighbors, in view of degree of proximity. For example, if another device is detected on media that is known to be independent of physical proximity and on media that is known to be physically limited, then the two devices are likely physically close to each other (i.e. in the same space). By way of an example, detection on the data communication media used for most system communications may be independent of physical proximity (e.g. most if not all system elements can send/receive messages via packet data communication with each other over such network media). However, light, sound and short range RF are examples of other communications media that may be physically limited. Sound communication may utilize a speaker and microphone in different system elements. Light communication may utilize modulation of the regular light source or transmission by a different emitter, e.g. an infrared emitter, in one system element and a light sensor in another element. Any of a variety of directional and omnidirectional light sensors may be used. A particular example of a sensor that can be used as an input device to determine direction and intensity is a quadrant hemispherical light detector or "QHD" (see e.g. U.S. Pat. Nos. 5,877,490 and 5,914,487). Detection of an identifiable communication signal from another intelligent system element over any one or more of these exemplary physically limited media, together with detected strength and/or direction of receipt of the signal from the other element, can be processed to determine a degree of physical proximity. The degree of physical proximity or other form of spatial location information about other system elements can be processed and used as part of the operations to rank system elements and choose some number as neighbors, as will be discussed more, later.

Also, as part of step S4, the element involved in self-commissioning may learn from one of the accessible other elements that the other element can act somewhat like a CO for commissioning, e.g. at least for purposes of assisting in the commissioning process by providing data about other elements and one or more logical groupings or sub-network configurations. If a detected neighbor element, for example, of an appropriate type has stored data that will assist the element that is self-commissioning, it may be more efficient for the commissioning element to obtain the data it needs from the identified one of its neighbors. In this later situation, processing may branch back from an iteration of step S4 to steps S2-S3 to obtain and information download to allow skipping of some later commissioning steps and thus expedite set-up of the particular element that needs commissioning at this time.

Assume for further discussion at this point, that there is no CO or similar function for supplying pre-configured data for the device discovered in either of steps S2 and S4. In such a situation, after identifying neighbors, the self-commissioning procedure flows through to step S5. Step 5 relates to a process allowing the one element to learn the capabilities of its identified neighbors and possibly tell neighbors of its capabilities. Although shown as a single step, this process at S5 may involve one, two or more communications back and forth between the element involved in self-commissioning and its neighbors, for example, to request information and receive capability information from the neighboring system elements.

After S5, the element has received and stored data identifying its neighbors and identifying various capabilities of its identified neighbors, for example, in a table or list. In the next step S6, the system element that is performing the self-commissioning prioritizes one or more such lists of its identified neighbors based on the neighbors' capability information. Selection and storage of data for grouping and configuration purposes, in later steps, will be based on prioritization.

The amount and/or detail of the information actually stored from the prioritized listing may depend on the memory capacity of the particular system element. A luminaire, for example, with relatively small long term memory capacity may identify a user interface (UI) device as a lighting controller and any sensors (S) in the vicinity, as relatively high priority elements from which the luminaire should receive command inputs and respond appropriately. Continuing with that example, other luminaires or light fixtures (lighting devices without sensor enhancements) may be considered as lower priority; and if the memory capacity of the luminaire or the like that is being commissioned is too small, capabilities information and possibly even the identifications of such other lighting devices may be parsed out of the neighbor listing before the listing is committed to long term memory storage. If capacity permits, in our luminaire example, the luminaire may at most store an identification of each of its neighbor luminaires along with a minimal indicator to the effect that each such identified neighbor element is itself another luminaire.

In some cases (e.g. to increase resilience to failure), it may be beneficial to store the table(s) in a distributed manner among the elements of the lighting system. Distributed storage, for example, may be implemented using any available distributed storage technique/structure (e.g. distributed hash tables). Alternatively, a system element may store "tags" that identify logical groups to which the particular element belongs. When the intelligent system element needs to communicate with group members, the element selects one or more of its group tags and requests members which share the selected tag(s) to respond. Conversely, if an intelligent system element receives a tagged request where all of the tags in the request have matching tags in the receiver's store, then and only then will that receiver device respond to the request. In these two cases, a "central overseer" function (CO) could have a global list of elements to monitor for changes (e.g. an unexpected new device or an expected device no longer responding). This CO function can be implemented centrally or in a distributed manner. A simple example of the distributed CO is one where every device has a randomly selected "buddy" device. If any device can no longer contact its "buddy," it will raise an alert/alarm.

The prioritization in step S6 may also utilize information about the number, types and/or strengths of the links or connections that the element has with its neighbors collected as outlined in the discussion of earlier steps. For example, if a lighting device is commissioning itself, the device might identify one of a number of user interface (UI) devices as its nearest neighbor element (based on collected proximity or other location data) of that type having lighting control function(s). The lighting device that is commissioning itself in such an example may then assign a high priority to the identification of that UI nearby neighbor device to essentially establish that neighbor UI device as the primary lighting controller from which the lighting device will accept and respond to lighting commands as a result of its self-commissioning. Based on its own capabilities, e.g. device type or functions and/or memory capacity, the intelligent system element that is commissioning itself stores some amount of the prioritized listing of neighbors in its long-term memory.

A user interface (UI) device programmed or the like to operate as a lighting controller goes through a similar procedure to identify neighbors and the neighbor elements' capabilities and then to prioritize a neighbor listing based on element capabilities. For example, that UI device may identify some number of lighting devices (L, EF in the example) having functions of types it is capable of controlling within some "radius" (e.g. number of network hops on one or more appropriate interfaces and/or within some degree of proximity) and retain that information within its long term memory as devices to which it sends lighting control commands. The "radius" or "distance" for purposes of relationship, trust or importance may be physical if determined from an appropriate sensed input related to proximity or from location information if available; or such a parameter may be purely logical. The distance parameter would be determined by prioritized list. Higher priority means the other element is a smaller "distance" away from the system element in question.

If there are multiple UI devices acting as lighting controllers within some proximity of the same or overlapping sets of lighting devices, they can exchange information as to each others' capabilities and possibly information as to the lighting devices that each can control; and based on that information, the UI devices prioritize the lighting devices in their respective neighbor lists to effectively negotiate the lists of lighting devices each will control. Depending upon the detected information, for example, both UI devices may alternately control the lighting devices that each detected (e.g. so that two lighting panels in one service area control all lights in that area). Such coordinated control may entail communications between the UI devices as well as the communications with the controlled lighting devices.

In another example, the capabilities information may allow a lighting device to identify and respond to two different UI devices that provide control commands for different lighting parameters, based on the capabilities information of the two UI devices. In such an example, one UI device may support ON/OFF and dimming type user inputs and provide corresponding lighting commands via the network media. For color tunable lighting, the other UI device may support color selection type user inputs and provide corresponding lighting commands via the network media. A lighting device that has received capabilities information from both such UI devices would prioritize its system element listing data to include both UI devices as system elements from which it will receive commands and respond accordingly, albeit based on ON/OFF and/or dimming commands from the first UI device and based on color setting commands from the other UI device.

Although described from the perspective of the system element that is implementing the self-commissioning, the system elements with which that element communicates during the process also update their stored neighbor and configuration data. For example, when a new lighting device is commissioning itself and communicates with other system elements, each of those other elements determines if the new lighting device is a neighbor and the relative priority of that new device. Depending on such priority, the new device may be added to the prioritized information stored in long term memory of one or more of the other system elements. For example, a neighboring UI device may add the identification and capability information for the new lighting device to its long term stored data as an indication of another lighting device for which the UI device acts as a lighting controller.

In this way, as more elements come on line and are commissioned, other previously commissioned elements learn more about the overall system and its configuration. As part of this exchange of information, one element may learn about neighbors of another system element even including some that the one element would not have identified as its own neighbors. For example, one UI interface device may learn from a lighting device that that device is configured to accept control commands from another UI device that is a neighbor of the lighting device. Although the two UI interface devices may not consider themselves neighbors, they may still communicate identification and capability information to effectively negotiate their relationship in controlling the particular lighting device (and possibly other lighting devices each UI device controls).

The discovery, provisioning and configuration may also enable a system element, such a lighting device, to detect and commission itself to respond to multiple levels of controllers, such as a UI device identified as the room-lighting controller for the lighting device, as a floor controller and as a building controller.

The room controller typically will be an actual device, such as UI device in our examples. A floor and/or building controller may be a hardware device somewhere in the system 10, or such broader area a controller may be implemented as processing functions or services on one or more system elements deployed for other purposes. For example, a lighting device enhanced with appropriate memory and processing capacity may be programmed to function as a floor controller as well. To other elements on the floor, this enhanced lighting device would appear on the network as a server with respect to client programming implemented by the system elements included within the floor control grouping or sub-network. If the system is arranged to utilize a client server model for such control functionalities, the server providing the floor or building level control may be implemented on a distributed basis, e.g. with instances of the respective server functionality running in coordinated fashion on two or more of the intelligent system elements in the premises. Since the higher level controllers may be implemented as individual hardware or as program functions of other equipment, they are considered as controller services, for purposes of further discussion herein.

The floor or building controller service, in at least some examples, will also operate as a central overseer (CO), to collect and distribute configuration data during the commissioning process of FIG. 5.

The configuration data stored in the intelligent system elements that are subject to the higher level controller(s) would include a priority relationship as between any such higher level controller services and the respective room controllers and/or any sensor responsive control functions implemented in respective individual system elements. For example, a command from a floor controller may override any command from a room lighting controller (from a local UI device) and over any lighting device setting established in response to a condition detected by a sensor. A building-wide controller service would have priority over any floor controller services in the building, as well as over the room controllers and the sensor responsive control functions. The floor and/or building control services may also allow interaction with other computers and/or terminal devices, such as elements 53 and 55 in the example of FIG. 1. The algorithms set at each level of the control hierarchy, however, may be varied and may be chosen by the system designer, the premises owner or the entities that will occupy some portion(s) or all of the service areas in the premises; and the priorities may in at least some premises be similarly set by the system designer, the premises owner or the entities that will occupy some portion(s) or all of the service areas.

Although control functions are discussed above for purposes of explaining the controller/controller service hierarchy as may be defined by the data priority in the commissioning process, the controller functionalities also will typically support related data communication for reporting or the like. For example, sensor and/or lighting device status data is reported to each higher level controller service and becomes available to other equipment or entities with appropriate access to the controller service, e.g. so that a building manager can see what rooms are illuminated, what rooms are occupied, ambient light levels, UI device states, which lighting devices are ON/OFF in relation to the other room states, and the like. Similarly, the higher level controller service(s) may offer access to some or all of such data to third parties, such as the power company.

For close location/proximity type sub-network configurations, e.g. for room sub-networks or the like, the element that is self-commissioning identifies neighbors and prioritizes and stores configuration data as outlined above.

To provide an extra channel for control as well as proximity discovery, a UI interface and/or a sensor may also support a light channel for at least some limited communication. A UI device may have a low power infrared transmitter, for example, that an fixture in the room enhanced with a corresponding sensor can detect as an indication that the UI device is within the same physical space (e.g. room or corridor). The enhanced fixture in turn can share that indication with other lighting devices and/or sensors in the lighting service area. Occupancy sensors that use infrared detection may be able to detect and share information about the UI device in a similar way.

Depending on the physical networking, in many installations, when a system comes on line and performs the network discovery step (S1 in FIG. 5) the element can 'see' or communicate with all of the system elements coupled to the network media within the particular premises. In an example like that of FIGS. 2-4, such an element may actually see all of the other elements on the system within the building. The element will communicate with and obtain data (e.g. identification and capability information) for all of the other networks, particularly if not told initially to use a smaller sub-set of such data by a central overseer functionality at steps S2-S3.

In steps S4 of FIG. 5, the elements may receive data from all other elements coupled to the network media of the lighting system. The element processed that data to identify neighbors and then collected capability information from the identified neighbors. However, before prioritizing a parsing data for storage, the element does have at least some information (e.g. identification) from each of the other elements of the system in the premises.

The element can also communicate through the system network to identify other system elements of particular types. For example, a sensor S may send a general query to other elements to obtain information and identify other sensors (or sensors of the same type as itself). Light fixtures including sensors, as well as standalone sensors, would respond with the requested sensor information. In a similar fashion, the element that is commissioning itself can send out a query to other elements and obtain identification of any higher level controller services.

Based on such information collected more generally from elements throughout the system, the element that is commissioning itself can identify itself as a member of one or more groups of elements having common characteristics. For example, all lighting devices (luminaires and enhanced light fixtures in several examples) may be identified together for logical association in one building-wide lighting device sub-network. Sensors or sensors of a particular type may be grouped for logical association in a sensor sub-network or a sensor sub-network for one type of sensor (e.g. occupancy sensors or ambient light level sensors). UI devices operating as lighting controllers may similarly identify themselves to each other, so as to logically associate such UI devices together in one sub-network.

As discussed above, for example, relative to FIGS. 3 and 4, the commissioning process configures various intelligent system elements to associate the element into logical functional groups or sub-networks. Some groups are "intrinsic" in that they are based on some characteristic of what a device is and/or what it can do (e.g. luminaire, sensor, camera, UI, pendent, downlight, color tunable lighting device, router, hub/gateway, etc.). Other groups are "physical" in that they are based on physical relationships between system elements (e.g. two elements can communicate directly, they are located in close physical proximity, they are in the same space, etc.). There are circles or groups that are "extended" in that they are based on application and/or context (e.g. Room 1, Conference Room, task light, ambient light, etc.).

Within these various types of groups, a particular intelligent system element can be a member by "declaration," i.e. someone (e.g. the element, a CO, a user, etc.) has declared that a given element belongs to a group, or the particular intelligent system element can be a member by "deduction," i.e. a probabilistic analysis suggests membership.

FIG. 5 shows the commissioning process as linear, but in practice, the commissioning process may be an iterative process.

Steps S4 and S5 are where the elements establish who is on the network, what element level intrinsic data do other element have and what is the network level intrinsic data. Steps S6 through S8 are where the elements (or COs) are taking that data and starting to fill-in the group memberships.

Before commissioning, an intelligent system element may have knowledge that some groups likely exist. Typically, these "known" groups would be based on intrinsic features and capabilities of the element (e.g. luminaire, sensor, UI, etc.). Since, by definition, the element has these features and capabilities, the element would declare itself to be part of these groups. Other groups may be preprogrammed as being "likely available" (e.g. Office, Conference Room, Corridor, Task Light, Ambient Light, etc.). Depending on the nature of these default groups, the intelligent system element may or may not declare membership by default.

Specific to group memberships, during the commissioning process (FIG. 5), the intelligent system element first looks for one or more COs (S2). If it finds a CO, the element will ask for what groups are visible on the network, what groups the system declares the element to be in, what groups the element can choose to join, who are other relevant group members, what probability functions should be used and what thresholds each group needs. If the information from the CO does not specify a complete configuration for the intelligent system element, the element begins looking for other intelligent system elements (S4) on each of its communication interfaces. For each other element found, the commissioning element collects and combines all available data about the other intelligent system (e.g. how many and which interfaces it can see the other element, what capabilities does the other element have, what groups is the other element part of, etc.) (S5).

In the prioritization step (S6), the commissioning device sorts other intelligent system elements based on "relevance" as calculated by a scoring function. The scoring function takes into account the number of shared commonalities (e.g. number of shared communication interfaces, which interfaces are shared (local interfaces preferred), number of overlapping group memberships, etc.).

In step S7, for each group that the commissioning intelligent system element knows about, it uses all the collected data and a weighted probability function to calculate the probability that it should be a member of that group. By way of a simple example, the new intelligent system element can see 5 other elements on a communication interface that is known to be limited to be local and each of these other elements is a member of a Room group. In that case, the commissioning element can deduce that it should likely join that group. Each group may have a different set of criteria weightings (e.g. in a "room x" grouping, visibility on local communication interfaces would be strongly weighted, whereas for a "building sensors" grouping, device type would be more important). This probability function may be implemented as a Bayesian joint probability function and may be run in parallel with steps S2, S4 and S5 to avoid needing to store large amounts of data on every intelligent system element. Note that declaring membership in a group is equivalent to setting this probability to 100% regardless of inputs.

After the probabilities of membership have been calculated, if any of the probabilities are above a threshold (threshold may vary by group), the intelligent system element can assume that it should be a member of that group. If the network has CO services coordinating the groupings, then the element would contact the appropriate CO service and request membership to each appropriate group. In an ad-hoc type network (i.e. no central coordination), the intelligent system element would set a membership flag and perhaps notify other group members of its membership (S8).

Note that as the intelligent system element goes through commissioning, it collects and processes data and may change state of its group memberships. From the perspective of other intelligent system elements, this means that the data set they used to commission has changed and may impact their state. So although the commissioning process is shown as linear, it should be appreciated that the commissioning process may be iterative until the device states stabilize.

Note also that since the commissioning process is an ongoing and iterative process, time series data can be used to modify the conclusions. For example, if a door separates an intelligent system element in a hall from one in a room, as the door is closed and opened, the local link between the two elements may be established and broken in such a way that the system could deduce that there is a door and adjust accordingly. Likewise, by keeping track of time-series data, as the system can grow increasingly wary of unknown new elements (e.g. raise an alert that perhaps an unauthorized user is trying to access the network), or it can transfer more complete knowledge to the new device, or it could raise an alert if an expected device is no longer communicating on the network.

A lighting fixture or other element can change groups. For example, software can be updated to a new software version, which may entail a change in a group to which the element should belong. This entails re-commissioning the element to the new task(s) defined by the updated software version. The new commissioning event could be triggered by a timer, a request from an operator and/or the request from the network itself. If an intelligent system element recognizes it may have changed groupings, the element may be allowed to request a new commissioning event. A new commissioning or commissioning update may be limited to a subset of the commissioning criteria.

The ongoing nature of the commissioning, and the inclusion of time-series data into the probability analysis can help the system as well. For example, if two light fixtures see each other intermittently on a local interface (e.g. light modulation), then maybe there's a door between them. If the system is extremely stable for a long period of time and then a new intelligent system element appears on the system for commissioning, the new device perhaps is an imposter/intruder. Security procedures can be implemented to determine authenticity of the new element. If the new element is supposed to be there, the old elements can perhaps give the new element the benefit of their experience so the new element does not need to learn everything from scratch. A third advantage of use of time-series data could be to help detect when an intelligent system element is starting to fail or has failed. In this later case, the other element that normally communicates with this impacted element may raise an alert/alarm if the quality of their link starts to degrade over time or if the particular element is simply no longer responsive.

The CO and associated higher level controller function will execute a similar commissioning processing. The CO and controller service, however, will retain the data for all of the devices that are subject to its control.

Some CO's may relate to a monitoring only service. Other CO functionalities may relate to a control only service and/or to a control service that is responsive to data (monitoring) from sensors and/or other system elements. Depending on the function of the CO/controller service, however, the CO commissioning may not involve identification and prioritizing of neighbors. For example, if the service operates at a building level, the associations for the CO/controller service may entail analysis of information about all elements in the system at least of a particular type, e.g. to identify and establish relationships with all lighting devices, or with all sensors of a particular type or with all UI devices set-up to operate as lighting controllers.

One or more CO/controller services may be for or include an associated system maintenance capability. Some or all of the elements of the system would then provide information to that CO/controller as may be appropriate for system health monitoring. For example, a lighting device in a room may determine that it has not heard from a sensor in its room for some extended period of time and report to the maintenance CO/controller so that that CO/controller can initiate appropriate further action (e.g. attempt to communicate with the sensor and perform a diagnostic and correction routine and report to a technician if that communication should fail). Similarly, if an existing element receives communication from a new element, it may communicate with the system maintenance or another CO/controller to determine if the new element should be on the network, before assisting the new element in its self-commissioning into the system.

The CO/controller services may be pre-programmed with some information to assist in commissioning. For example, a CO/controller may be pre-programmed with a list of other system elements that are expected to be in the building.

Anything that can not be resolved by the automatic procedure can be corrected by manual provisioning and/or configuration of one or more of the system elements. In our example where two different UI devices detect one or more lighting devices in common, if the UI and lighting devices can not negotiate a relationship as to which lighting devices each will control or they select an arrangement that the building owner or occupant(s) determine is inappropriate, a technician with network access can communicate with the UI devices (and if necessary, with the affected lighting devices) to change the stored configuration data in various devices as necessary to establish more desirable relationships. The technician with network access can similar set or change the stored configuration data in any of the intelligent elements of the system 10, as needed or as may be desired to establish a particular configuration of one or more elements of the system. Also, the technician could put the settings in through an applicable CO service and/or force the particular system element to re-commission from scratch.

Once the system is successfully set-up at a particular premises, the system could be logically locked down. The CO/controllers could be programmed not to allow commissioning of new elements into the system. When a new device is installed as a repair or replacement, or when a number of elements are replaced when some or all of the premises are remodeled, the CO/controllers would be reset to allow new self-commission of elements into the system. As a result, data for the new elements would replace data for old removed elements, in the CO/controller services and in any of the old elements that may remain installed at the premises. Once the replacement or upgrade for remodeling is complete, the CO/controllers again could be programmed not to allow commissioning of new elements into the system, to thereby re-lock the system against intruder devices.

Many user interface (UI) devices, set-up as light controller elements, will be relatively permanently installed at various locations about the premises, e.g. as wall panels in various lighting service areas. Sensors and/or lighting devices may similarly be permanently installed in particular locations about the premises. However, some UI devices and sensors, and even some lighting devices, may be portable. Once commissioned for operation in the system at the premises, such portable devices would still be recognized at least as members of the system by the CO/controller services within the premises, although some re-commissioning may be needed to update configuration data in the portable device and elements in areas from and to which a portable device is moved. For enhanced security, only devices known to be portable might be permitted to re-commission upon movement.

Over time, the process of commissioning as in FIG. 5 as well as any desired manual corrections, may occur some number of times; and as a result, the system learns more and more about its set-up. The system may be said to become more 'self-aware.' With repeated commissioning iterations, the degree of manual correction or adjustment will likely decrease. Even without manual intervention, as the devices talk to each other during several iterations of the commissioning process, the overall system tends to optimize its provisioning and configuration settings.

The commissioning operations under consideration here involve acquisition and storage of data to facilitate operations of elements of the system, that relate to several layers of the protocol and/or software stack(s) utilized by the system elements. For some purposes, the protocol stack and aspects of the programming/configuration at various layers are defined and secured by the system manufacturer; however, the system manufacturer may opt to allow third parties some access to program or other which interact at various layers of the stack, for example, to allow third parties to manufacturer and sell other elements or devices for use on the system and/or to allow third parties to write applications for the system.

To provide a framework for this part of our discussion, it may help to consider a model of a protocol stack. The Open Systems Interconnection (OSI) model defines a seven layer-stack. The OSI reference model is not itself a network architecture. Rather it specifies a hierarchy of protocol layers and defines the function of each layer in the network.

As a logical matter, operations or functions at each layer performed on one device communicate only with the functions at that layer performed on another device, in accordance with a protocol defining the rules of this communication. However, to achieve such communication across a network, the operations or functions at the layer transfer information down from layer to layer in one through the lower layers of the stack on the device, then through the channel medium of the network, and up from layer to layer of the lower layers on the other device to reach and communicate with the same layer on the other device. With this approach, it is easy to consider each of the layers as communicating with its counterpart at the same level, in a "horizontal" direction, for purposes of design of the various layers and understanding their functions.

The bottom layer of the OSI stack model is the physical communication layer, which deals with physical and electrical aspects of the protocol. The physical communication layer provides transmission of raw data bits over the physical communication channel through the particular network. On top of the physical layer, the next layer is the data link layer, which provides provide services to enable transfer of data between network entities via the media used at the physical layer. The data link layer transforms the physical layer, which interfaces directly with the channel medium, into a communication link that appears error-free to the next layer above. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

On top of the data link layer, the next layer is the network layer, facilitates the transfer of data to a host on another network while maintaining a desired level of quality of service. The network layer provides capabilities required to control connections between end systems through the network, e.g., set-up and tear-down of connections. Internet Protocol (IP), for example, may be implemented in the network layer of the OSI model. An IP address therefore is associated with protocol services at the network layer.

On top of the network layer, the OSI model specifies a transport layer protocol, which provides reliable control of data transfer between end systems. The transport layer, for example, may provide error control, flow control and/or data segmentation. TCP (Transmission Control Protocol) and UDP (User Datagram Protocol) typically run at the transport layer on top of network layer IP.

Above the transport layer, a session layer is responsible for establishing and managing communication sessions between presentation entities, that is to say between entities operating at the next higher layer of the protocol stack. For example, the session layer determines which entity communicates at a given time and establishes any necessary synchronization between the entities. Above the session layer, a presentation layer serves to represent information transferred between applications in a manner that preserves its meaning (semantics) while resolving differences in the actual representation (syntax).

A protocol that is specific to the actual application that utilizes the information communicated runs at the top of the protocol stack. Hence, the top layer of the stack is referred to as the application layer.

In actual system implementations, two or more of the layers of the stack may be combined into functions of a smaller number of layers or into just one layer.

In a commissioning process like that of FIG. 5, the data link layer information and network layer information needed for communication through the network media of a system 10 at a particular premises are accumulated and stored as part in the network discovery at step S1.

The CO/controller services and the responsive operations of the system elements are implemented at the application layer. Hence, the configuration of at least those aspects involve storing appropriate data for use at the application layer. It is envisioned that the system manufacturer will likely specify (and secure) some particular application layer functions, for example, for basic system operations and maintenance; and such an arrangement will limit the configuration that is stored for that portion of the application layer.

However, it is also envisioned that the system 10 will be open to third party application and/or device developers. Third parties will be able to build devices that utilize the system and its protocols for operation including interactions with elements provided by the system manufacturer. Commissioning of such a third party device on the system will be similar to that discussed above relative to FIG. 5 and will involve storing provisioning data for device communications in the particular device and storing configuration in the device for its logical associations with other network elements and CO/controller services of the system manufacturer.

However, third parties will also be allowed to write application layer programming for their own CO/controller services and for system elements like the luminaires (L), enhanced light fixtures (EF), user interface (UI) devices, and sensors (S). For such third party applications, lower layers of the protocol stack will be open in that they will accept and facilitate communications of application programming written by other parties executing on the various system elements shown and described herein. The commissioning of the elements for use in execution of the third party application programming will include obtaining and storing application layer configuration data for the third party applications running within the system 10, on the elements (such as L, EF, UI and S) running related third party application programming and any of those elements or other hardware platforms on the system 10 that may be running the application programming for a third party's CO/controller service.

Actual implementations may involve CO/controller service implementation or include functionalities at other layers of the stack with corresponding functionalities at the same layer of the stack in the other system elements. In such a case, the system manufacturer would still have portions of the programming and configuration routine at those layer(s) limited to that manufacturer's programs, devices and personnel. However, so long as not interfering with the manufacturer's functionalities and configuration data at the particular layer(s), third parties will be allowed to program and establish configuration at the same protocol layer(s) for their own purposes.

The open approach, for example, may enable a customer that will own or occupy a particular premises having a networked lighting system 10, using intelligent elements as discussed above, to purchase and install third party devices and/or to purchase additional programming for desired functions different from (or possibly competing with) those offered by the system manufacturer.

The third party devices and programming may relate to lighting, much like the elements and programming for lighting services offered by the manufacturer of the networked lighting system 10. However, the third party devices and thus the associated programming may relate to a wide range of other functions or services intended for operation in the premises in some manner that will utilize the communication transport capability and possibly other capabilities of the networked lighting system 10.

The degree of third party access to the layers of the protocol stack may vary amongst third party vendors. A trusted or 'certified 'partner' may have access to more layers, whereas non-certified third parties may only be allowed to connect to the media and write application layer programming that otherwise conforms to the application layer programming interfaces to the lower layers of the protocol stack.

Users of different types may also be granted access to different amounts of the protocol stack, e.g. to adjust configurations in a desired manner. For example, a government entity with a high degree of sophistication and a need for security may have greater access to control its system, whereas a small business enterprise may only be allowed access to adjust the commissioning/configuration at the application level.

In most of the examples, we have assumed commissioning from the individual element perspective typically when the element is first installed. As noted earlier, other elements already commissioned on the system will update their configuration data to reflect the addition of the new element, as a result of communications with the element as the new element is commissioned. The system may also support re-execution of the commissioning procedure by one or more of the system elements for a variety of reasons. For example, if a particular element has been diagnosed with a configuration fault, an applicable CO/controller service can instruct that element to initiate its self-commissioning routine. As another example, if the firmware of a particular element is replaced, e.g. as a repair or as an upgrade, the element may automatically initiate the commissioning routine to confirm accuracy of any configuration data still stored in the element and/or to obtain configuration data in the event that the firmware installation erased or overwrote the old data. As another example, an element may initiate commissioning if a new piece of hardware is installed (e.g. if a sensor is added as an extra enhancement to a light fixture). These re-commissioning operations will re-check or replace configuration data in the effected element and will often result in re-check, change or replacement of related configuration data in the CO/controller(s) and any other system elements with which the effected element is logically associated.

The lighting system 10 may operate as a heuristic neural network, where the various intelligent elements of the system learn and shared learned information about each other and/or conditions and patterns of conditions within various areas of the premises.

Figure 6:
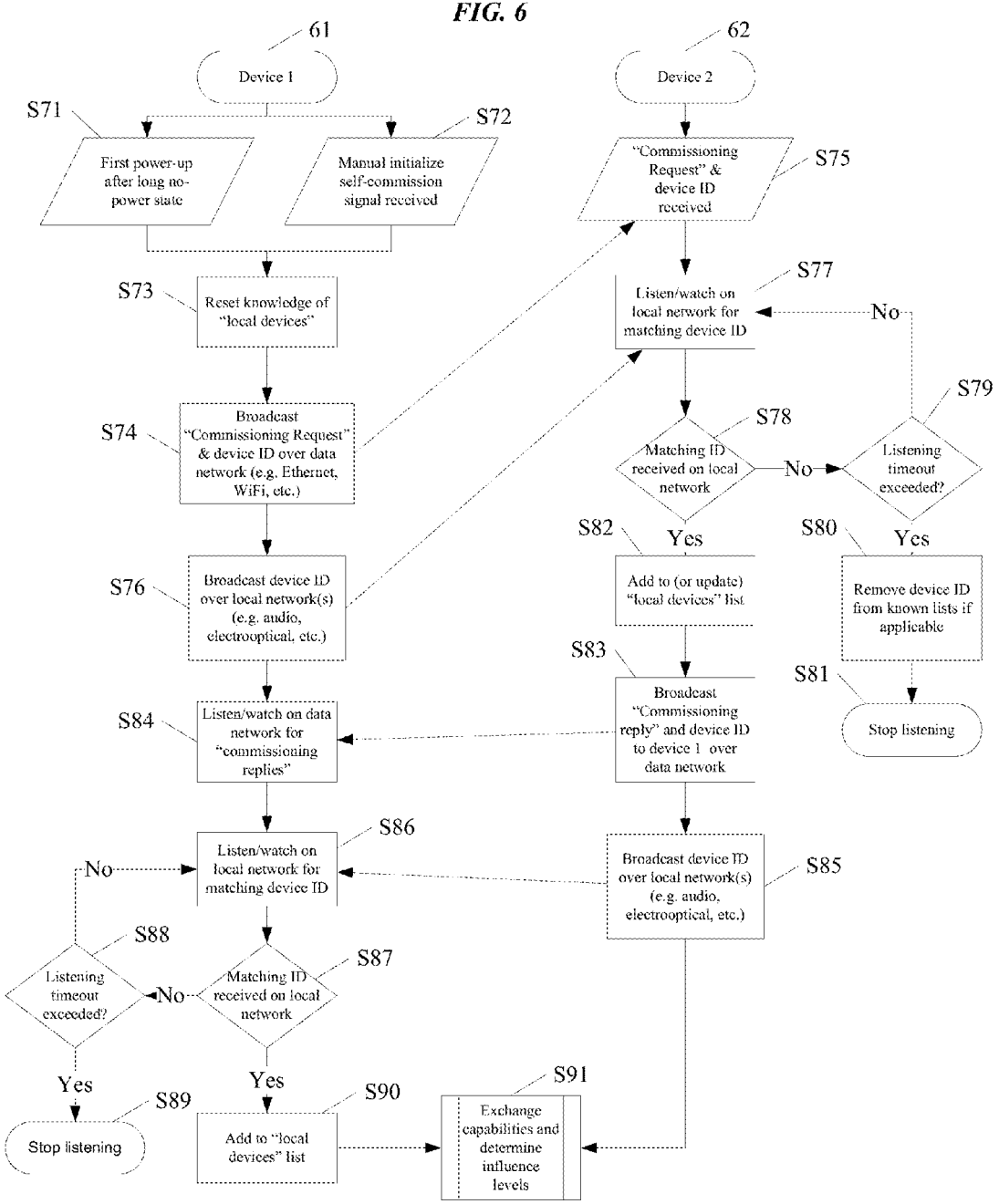
FIG. 6 is a somewhat more detailed flow chart of an exemplary procedure for self-commissioning, e.g. for an ad hoc network commissioning.

FIG. 6 is a somewhat more detailed flow chart illustrating an exemplary self-commissioning procedure, e.g. for an ad hoc network commissioning (e.g. for a fairly simple system that may not include CO services). This example shows two devices 61 and 62 involved in communications with each other. The device 1 (61) is initiating and self-commissioning, and the device 2 (62) is responding and updating its stored configuration data, so as to update its own commissioning in view of its interaction with device 1 (61). Although referred to here as devices, the devices 61, 62 may be lighting devices or any other type of elements of system such as the lighting system 10 of FIG. 1. Also, although the drawing shows the commissioning device 1 (61) interacting with only one other device, in many installations, the commissioning device 1 (61) will interact with any number of other system elements in a manner similar to the interaction with device 2 (62) shown in the example of FIG. 6.

A commissioning procedure may be triggered in several different ways, two of which are illustrated in FIG. 6 by way of examples. In step S71, the device 61 is first powered-up after a relatively long no-power state, for example, after a new installation. Alternatively, the device 61 may initiate commissioning in response to an instruction signal responsive to some manual intervention by a technician or the like, for example, received as a light input of a predetermined type by a device having a light sensor or as a command signal of a particular type received via the network media of the system 10 (from a user terminal in the premises or at a remote location such as an operations center of the vendor or other provider of a maintenance service).

In response to the appropriate condition at step S71 or S72, the device 61 initiates its self-commissioning routine. Although not shown for convenience in FIG. 6, the commissioning process may include a network discovery step like step S1 in FIG. 5, e.g. to detect the physical network media and exchange identification data with other elements on the particular network media as may be appropriate to enable to device to communicate via the network elements of the system 10. In the exemplary process of FIG. 6, however, further discussion will assume that the device 61 has successfully completed network discovery as part of the current commissioning or as a result of an earlier commissioning procedure.

In the example of FIG. 6, in step S73, the device 61 resets its knowledge of "local devices" in its internal long-term storage. In this way, any local device data in its internal knowledge database is cleared, to allow storage of new configuration data regarding local devices, as will be obtained in later steps of the process of FIG. 6.

As outlined above, the device is coupled for communication via the data network media in the particular premises, and the device 61 has completed network discovery. As result, the device 61 is able to communicate with other system elements within the premises via networked data communications. At step S74, the device 61 broadcasts a "Commissioning Request" signal to other elements on the system, via the data network media (e.g. Ethernet, or WiFi etc.). Although only one other element, e.g. another lighting device 62 is shown, the device 61 sends this signal to other lighting devices, to UI devices, to intelligent sensors and to any CO/controller services or devices implemented in and communicating on the system 10 within the particular premises. The Commissioning Request includes an identifier (ID) of the sending device, in this example, of the first device 61.

Hence, the broadcast of the Commissioning Request is received in various system elements, including the device 62 in our exemplary process flow, as represented by step S75. Steps S74 and S75 involve communication over the network media.

The example of FIG. 6 assumes that devices within proximity of each other have two or more channels of communication. One such channel utilizes the network media in the premises. The additional channel(s) use a more localized media, such as modulated light transmission from one lighting device to a sensor in a standalone device or in an enhanced light fixture. Such a light channel may use visible light or light in a different wavelength or frequency band, such as UV (ultraviolet) or IR (infrared). Another local channel that may be used is an audio channel, for example, sent between system elements that include speakers/microphones and appropriate interface circuitry. Hence, at step S76, the first device 61 once again broadcasts at least its ID signal, but at this point in the process, over one or more of the alternate channels (e.g. as modulated light or audio) instead of over the network media. The other system elements within range of the alternate channel broadcast, such as the second device 62, listens (audio) or watches (light) on that local 'network' channel (step S77) for an ID matching that received earlier in step S75.

In step S78, the second device 62 determines if it has received an ID matching that received earlier in step S75. If no matching ID has been received, the second device 62 determines whether or not a set time interval has elapsed since it received the ID over the data network link in step S75. If the interval has not timed out, the device 62 continues to listen (S77) and check for receipt of a matching ID. In this way, the device 62 will loop through steps S77 to S79 until timeout, i.e. until its wait time has exceeded the set interval length (assuming still no matching ID has been received over the alternate channel). In this situation, the second device process flow branches from step S79 to step S80. In step S80, the second device 62 will remove the ID received in step S75 from any known lists within memory of that device in which the device 62 may have stored that ID, and the processing by device 62 ends at step S81.

Returning to step S78 in the processing by the second device 62, assume now that the device has listened or watched (S77) and received a matching ID over the local alternate channel (e.g. light or audio). Hence, processing by the second device 62 now branches at S78 to step S82. In step S82, the second device 62 adds the received ID of device 61 (or updates) its local device list stored in memory of the device 62. In step S83, the second device 62 broadcasts a "Commissioning reply" with the device ID of that device 62 back over the data communication media of the system network to device 1.

After broadcasting its ID over the alternate local media (e.g. light or sound) in step S84, the first device listens for responsive commissioning replies from other system elements (step S84). The device 61 may receive commissioning replies from any number of other system elements while listening in step S84. In our example, when device 62 broadcasts its reply in step S83, the first device is listening (S84) and receives the commissioning reply with the ID for device 62.

As noted, this example assumes at least one additional/alternative media of communication (e.g. light or sound) between the elements within a room or other service area. Hence in the process of FIG. 6, the second device also broadcasts its own device ID over the alternate network communication media in step S85. Hence, the first device 61 also listens on the alternate communication network channel(s). At S86, the first device 61 listens (audio) or watches (light) on local network for matching device ID of device 62 that the device 61 received in step S84.

In step S87, the first device 61 determines if it has received an ID matching that received earlier in step S84. If no matching ID has been received, the first device 61 determines whether or not a set time interval has elapsed since it received the ID over the alternate network link in step S88. If the interval has not timed out, the device 61 continues to listen or watch (S86) and check for receipt of a matching ID. In this way, the device 61 will loop through steps S86 to S88 until timeout, i.e. until its wait time has exceeded the set interval length (assuming still no matching ID has been received over the alternate channel). In this situation, the first device process flow branches from step S88 to step S89, where processing by first device 61 ends.

Returning to step S87, assume now that while listening or watching, the device 61 has received an ID that matches the ID of device 62. Hence, in that case, the processing by device 61 branches from step S87 to step S90. In step S90, the first device adds the received and matched ID (in this example, the ID of device 62) to the list of local devices within device 61. In step S91, the two device communicate with each other over one or more of the channels (e.g. over the data communication network media), to exchange capabilities. Each device can process the received capabilities information about the other device to determine influence levels (e.g. in a manner similar to steps S5-S8 from FIG. 5). Similar information is gathered about other system elements in the vicinity, with which each of devices 61 and 62 can over the data network media and one or more alternate channels. In this way, the device 61 accumulates data regarding other devices or other elements in the vicinity for prioritizing its neighbor list, as part of its self-commissioning. The second device, which may have already commissioned itself and have an existing prioritized neighbor list can add the device 61 and information about the capabilities thereof to the neighbor list/information stored in that device 62.

As noted above, the process flow of FIG. 6 represents an exemplary self-commissioning procedure for an ad hoc network commissioning, e.g. for a fairly simple system that may not include CO services. However, some aspects or steps of the process in that drawing also may be used as a more detailed implementation of some of the steps of the more general process flow of FIG. 5. For example, steps such as S74 to S90 may be used as a procedure to implement the neighbor discovery step S4 of FIG. 5.

Figure 9:
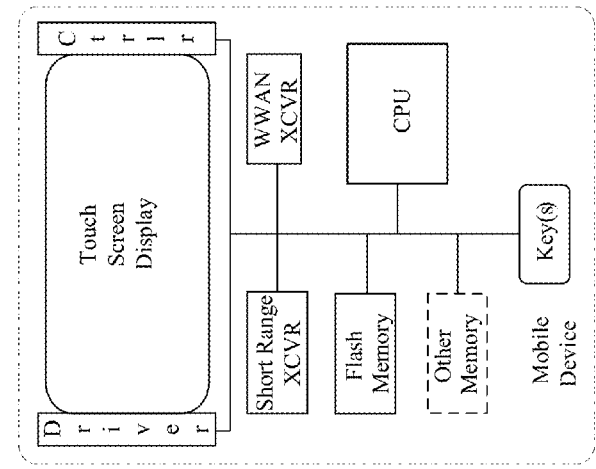
FIG. 9 is a simplified functional block diagram of a mobile device, as an alternate example of a user terminal device, for possible communication in or with the system of FIG. 1.
Figure 7:
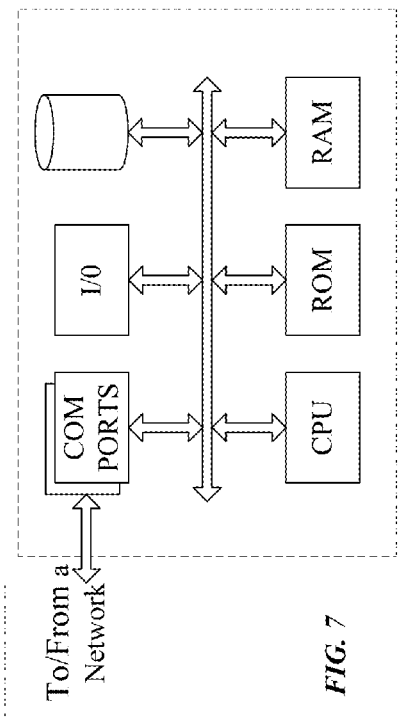
FIG. 7 is a is a simplified functional block diagram of a computer that may be configured as a host or server, for example, to function as the external server or a server if provided at the premises in the system of FIG. 1.
Figure 8:
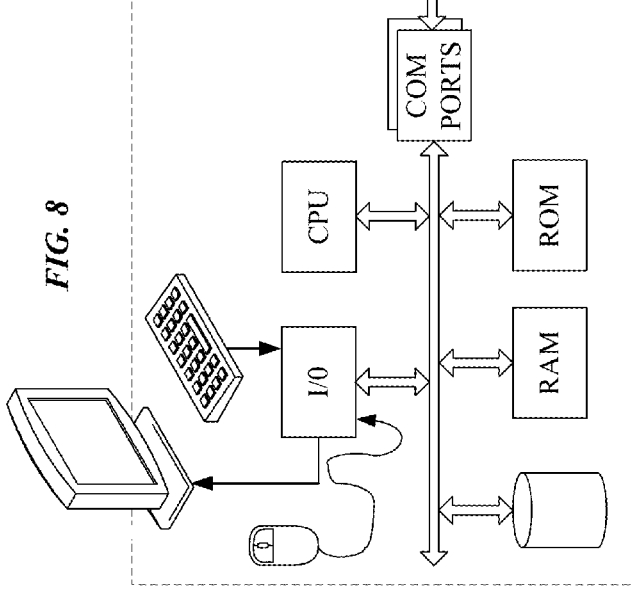
FIG. 8 is a simplified functional block diagram of a personal computer or other user terminal device, which may be used as the remote access terminal, in the system of FIG. 1.

As shown by the above discussion, at least some functions of devices associated or in communication with the networked lighting system 10 of FIG. 1, such as elements shown at 53, 55 and 57, may be implemented with general purpose computers or other general purpose user terminal devices, although special purpose devices may be used. FIGS. 7-9 provide functional block diagram illustrations of exemplary general purpose hardware platforms.

FIG. 7 illustrates a network or host computer platform, as may typically be used to implement a host or server, such the computer 53 or if provided as a separate platform the CO computer 57. FIG. 8 depicts a computer with user interface elements, as may be used to implement a personal computer or other type of work station or terminal device, such as one of the terminal 55 in FIG. 1, although the computer of FIG. 8 may also act as a server if appropriately programmed. The block diagram of a hardware platform of FIG. 9 represents an example of a mobile device, such as a tablet computer, smartphone or the like with a network interface to a wireless link, which may alternatively serve as a user terminal device like 55. It is believed that those skilled in the art are familiar with the structure, programming and general operation of such computer equipment and as a result the drawings should be self-explanatory.

A server (see e.g. FIG. 7), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Also, a computer configured as a server with respect to one layer or function may be configured as a client of a server in a different layer and/or for a different function. For example, the intelligent lighting devices 11A, 11B may operate as client devices of server functions implemented by CO 57, whereas the same platform performing the CO function may function as a client or as a server with respect to the computer 53. Also, user terminal devices such as 55 often are configured as client devices; and the CO 57 may function as a server with respect to client functionalities of devices such as 55.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 8). A mobile device (see FIG. 9) type user terminal may include similar elements, but will typically use smaller components that also require less power, to facilitate implementation in a portable form factor. The example of FIG. 9 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 7 and the terminal computer platform of FIG. 8 are shown by way of example as using a RAM type main memory and a hard disk drive for mass storage of data and programming, whereas the mobile device of FIG. 9 includes a flash memory and may include other miniature memory devices. It may be noted, however, that more modern computer architecture, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 8). The mobile device example in FIG. 9 touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 7-9 in their present form show computers and user terminal devices, generally similar configurations also may be used within other elements of the lighting system 10. For example, one implementation of the brain, communication and interface elements of a lighting device, a standalone sensor or a user interface device may utilize an architecture similar to that of one of the computers or mobile terminals. As a more specific example, the personal computer type hardware in FIG. 8 (except for the keyboard, mouse and display) could serve as the brain and communication elements of a lighting device, where the input/output interface I/O would interface to an appropriate light driver and to any sensor(s) or other enhancement input or output device(s) included within the lighting device. As another example of use of an architecture similar to those of FIGS. 7-9 that may be utilized in a system like that of FIG. 1, a lighting controller or other user interface device (UI) might utilize an arrangement similar to the mobile device of FIG. 9, albeit possibly with only one transceiver compatible with the networking technology of the particular premises (e.g. to reduce costs).

For information about other examples of intelligent lighting devices, which may be suitable for use in a networked lighting system like that of FIG. 1, attention may be directed to U.S. application Ser. No. 13/463,594 Filed May 3, 2012 entitled "LIGHTING DEVICES WITH INTEGRAL SENSORS FOR DETECTING ONE OR MORE EXTERNAL CONDITIONS AND NETWORKED SYSTEM USING SUCH DEVICES," the disclosure of which is entirely incorporated herein by reference.

As also outlined above, aspects of the autonomous commissioning procedure (e.g. of FIG. 2 and/or FIG. 6), may be embodied in programming of the appropriate system elements. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer 53 of the lighting system service provider into the computer platform of the CO 57 or into any of the lighting devices, sensors, user interface devices or third party devices. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system, comprising:
   intelligent system elements, each respective intelligent system element comprising:
   a communication interface configured to enable communication via a network link;
   a memory;
   configuration data stored in the memory to implement a logical network arrangement of the respective intelligent system element with one or more others of the intelligent system elements to provide controlled lighting for a service area; and
   a processor coupled to have access to the memory and to communicate via the communication interface and the network link intelligent system element and configured to control operations of the respective intelligent system element, wherein:
   each of a plurality of the intelligent system elements includes a light source and is configured to operate as a lighting device,
   at least one of the intelligent system elements either includes a user interface element and is configured for lighting control or includes a detector and is configured as a sensor, and
   the processor of the respective intelligent system element is configured to cause the respective intelligent system element to implement functions, including functions to, upon a change impacting the logical network arrangement:
   automatically exchange communications with one or more others of the intelligent system elements to autonomously establish an updated logical network arrangement of the respective intelligent system element with one or more others of the intelligent system elements;
   store updated configuration data in the memory to implement the updated logical network arrangement of the respective intelligent system element with one or more others of the intelligent system elements; and
   automatically cooperate with one or more others of the intelligent system elements in the updated logical network arrangement to provide the controlled lighting for the service area, based on the updated configuration data.

2. The system of claim 1, wherein the function to automatically exchange communications with one or more others of the intelligent system elements implemented by the respective intelligent system element comprises functions to:
   send a signal identifying the respective intelligent system element to each of one or more others of the intelligent system elements;
   receive from each of one or more others of the intelligent system elements a signal identifying a respective other intelligent system element; and
   store each received identification of another of intelligent system element in the memory.

3. The system of claim 2, wherein the processor of the respective intelligent system element is configured to cause the respective intelligent system element to implement further functions, including functions to:
   send information identifying capabilities of the respective intelligent system element to each of one or more others of the intelligent system elements; and
   receive and store in the memory of the respective intelligent system element information identifying capabilities of each of one or more others of the intelligent system elements in association with the stored identification of each of the one or more others of the intelligent system elements.

4. The system of claim 3, wherein the processor of the respective intelligent system element is configured to cause the respective intelligent system element to implement further functions, including functions to:
   determine relative proximity of one or more other intelligent system elements to the respective intelligent system element;
   prioritize a listing of identifications of one or more other intelligent system elements stored in the memory based on the determined relative proximity; and
   based on the listing prioritized based on relative proximity, select the identification of at least one of the others of the intelligent system elements, to establish the updated logical network association.

5. The system of claim 4, wherein the processor of the respective intelligent system element is configured to cause the respective intelligent system element to implement further functions, including functions to:
prioritize a listing of one or more other intelligent system elements stored in the memory based on the received information identifying capabilities of one or more others of the intelligent system elements; and
based on the listing prioritized based on capabilities, select the identification of at least one other intelligent system element, to establish another logical network association of the respective lighting device with the at least one other intelligent system element.

6. The system of claim 1, wherein:
the configuration data stored in the memory identifies either the respective intelligent lighting system element or another intelligent lighting system element as a leader of the logical network arrangement; and
the updated configuration data stored in the memory identifies a different one of the respective intelligent lighting system element or another intelligent lighting system element as a new leader with respect to the updated logical network arrangement.

7. The system of claim 1, wherein:
the change is addition of a new intelligent lighting system element; and
the updated configuration data stored in the memory identifies the new intelligent lighting system element as part of the updated logical network arrangement.

8. The system of claim 1, wherein at least one stored configuration data configures a respective logical network arrangement to enable one or more intelligent lighting system elements to interact with a network connected computer of a service entity via a network extending outside the area.

9. A lighting device comprising:
a light source;
a communication interface configured to enable communication via a network link;
a memory;
configuration data stored in the memory to implement a logical network arrangement of the lighting device with one or more other elements of a lighting system to provide controlled lighting for a service area; and
a processor coupled to the light source and the communication interface, wherein the processor is configured to operate the device to implement functions including functions to, upon a change impacting the logical network arrangement:
send a signal identifying the lighting device to each of one or more other elements of the lighting system;
receive from each of one or more others elements: an identification of a respective other lighting system element and information about operational capabilities of each respective other lighting system element from which an identification was received;
prioritize a list of identifications of one or more identified other lighting system elements, based on the received capability information about the capabilities of the one or more identified other lighting system elements; and
store in the memory at least a portion of the prioritized list of identifications and information about capabilities of other lighting system elements corresponding to identifications included in the stored portion of the prioritized list, in such a manner as to create updated configuration data to establish an updated logical sub-network arrangement of the lighting device and identified other lighting system elements including at least some communication via the network link to automatically cooperate to provide the controlled lighting for the service area.

10. A lighting controller comprising:
a user input device;
a communication interface configured to enable communication via a network link;
a memory;
configuration data stored in the memory to implement a logical network arrangement of the lighting controller with one or more lighting devices to provide controlled lighting for a service area; and
a processor coupled to the user input device and the communication interface, wherein the processor is configured to operate the controller to implement functions including functions to, upon a change impacting the logical network arrangement:
send a signal identifying the lighting controller to each of one or more lighting devices;
receive from each of the one or more lighting devices: an identification of a respective one of the one or more lighting devices and information about operational capabilities of each respective one of the lighting devices;
prioritize a list of identifications of the one or more lighting devices, based on the received information about the capabilities of the one or more lighting devices; and
store in the memory at least a portion of the prioritized list of identifications and information about capabilities of each of the lighting devices corresponding to an identification included in the stored portion of the prioritized list, in such a manner as to create updated configuration data to establish an updated logical sub-network arrangement of the lighting controller and one or more lighting devices including at least some communication via the network link to automatically cooperate to provide the controlled lighting for the service area.

11. A sensor device comprising:
a detector;
a detector interface circuit coupled to the detector;
a communication interface configured to enable communication via a network link;
a memory;
configuration data stored in the memory to implement a logical network arrangement of the sensor device with one or more lighting devices to provide controlled lighting for a service area; and
a processor coupled to the detector interface circuit and the communication interface, wherein the processor is configured to operate the sensor device to implement functions including functions to, upon a change impacting the logical network arrangement:
send a signal identifying the sensor device to each of one or more lighting devices;
receive from each of the one or more lighting devices: an identification of a respective one of the one or more lighting devices and information about operational capabilities of each respective one of the lighting devices;

prioritize a list of identifications of the one or more lighting devices, based on the received information about the capabilities of the one or more lighting devices; and store in the memory at least a portion of the prioritized list of identifications and information about capabilities of each of the lighting devices corresponding to an identification included in the stored portion of the prioritized list, in such a manner as to create updated configuration data to establish an updated logical sub-network arrangement of the sensor device and one or more lighting devices including at least some communication via the network link to automatically cooperate to provide the controlled lighting for the service area.

12. A system, comprising:

first lighting devices and a first lighting controller, located for lighting service of a first area and coupled together for network communication with each other to form a first physical network;

second lighting devices and a second lighting controller, located for lighting service of a second area separate from the first area and coupled together for network communication with each other to form a second physical network;

each lighting device including a light source, a processor, a memory and a communication interface;

each lighting controller including a processor, a memory and a communication interface;

communication links coupling the first and second physical networks into a wider area network;

provisioning data stored in the memories of the first lighting devices and the first lighting controller to enable physical communication among the first lighting devices and the first lighting controller and to enable physical communication of the first lighting devices and the first lighting controller via the wider area network;

configuration data stored in the memories of the first lighting devices and the first lighting controller for logically associating the first lighting devices and the first lighting controller together to operate as a first area lighting system;

provisioning data stored in the memories of the second lighting devices and the second lighting controller to enable physical communication among the second lighting devices and the second lighting controller and to enable physical communication of the second lighting devices and the second lighting controller via the wider area network;

configuration data stored in the memories of the second lighting devices and the second lighting controller for logically associating the second lighting devices and the second lighting controller together to operate as a second area lighting system; and configuration data stored in the memories of at least one of the first lighting devices or the first lighting controller and stored in the memories of at least one of the second lighting devices or the second lighting controller logically associating the at least one of the first lighting devices or the first lighting controller and the at least one of the second lighting devices or the second lighting controller together to interact with a network connected computer of a service entity via a link of the wider area network to a network extending outside the areas.

13. The system of claim 12, further comprising a central controller service, wherein the configuration data stored in the first and second lighting devices further configures the first and second lighting devices to logically associate the first and second lighting devices in a sub-network group together with the central controller service.

14. The system of claim 13, wherein the central controller service also is configured to implement a central overseer function to provide at least some of the configuration data to the first and second lighting devices.

15. The system of claim 12, further comprising a central controller service, wherein the configuration data stored in the first and second lighting controllers further configures the first and second lighting controllers to logically associate the first and second lighting controllers in a sub-network group together with the central controller service.

16. The system of claim 15, wherein the central controller service also is configured to implement a central overseer function to provide at least some of the configuration data to the first and second lighting controllers.

17. The system of claim 12, further comprising:

the network connected computer, wherein the network connected computer is configured to:
remotely monitor health of at least some of the first and second lighting devices or first and second lighting controllers of the system via the network extending outside the areas, and communicate via the network extending outside the areas with at least some of the first and second lighting devices or first and second lighting controllers of the system to remotely service elements of the system.

18. The system of claim 17, wherein the communication to remotely service elements of the system supports one or more of troubleshooting, software corrections or software corrections upgrades lighting devices or lighting controllers.

* * * * *